(12) United States Patent  (10) Patent No.: US 8,581,988 B2
Hasegawa                    (45) Date of Patent:    Nov. 12, 2013

(54) DATA TRANSFER APPARATUS, IMAGING APPARATUS, AND DATA TRANSFER SYSTEM

(75) Inventor: Hiroyuki Hasegawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1254 days.

(21) Appl. No.: 11/946,118

(22) Filed: Nov. 28, 2007

(65) Prior Publication Data

US 2008/0137506 A1 Jun. 12, 2008

(30) Foreign Application Priority Data

Dec. 11, 2006 (JP) ................................. 2006-333870

(51) Int. Cl.
*H04N 5/225* (2006.01)
*H04N 9/04* (2006.01)

(52) U.S. Cl.
USPC .................. 348/207.1; 348/231.1; 348/231.2; 348/231.99

(58) Field of Classification Search
USPC ........... 348/222.1, 552, 207.1, 207.11, 231.1, 348/231.2, 231.99, 231.7
See application file for complete search history.

(56) References Cited

U.S. PATENT DOCUMENTS

2002/0021359 A1 * 2/2002 Okamoto ....................... 348/222
2005/0265169 A1   12/2005 Yoshimaru et al.
2006/0110127 A1 * 5/2006 Iggulden ......................... 386/52

FOREIGN PATENT DOCUMENTS

| CN | 1705361 A | 12/2005 |
|---|---|---|
| JP | 2005-085359 | 3/2005 |
| JP | 2005085359 A * | 3/2005 |
| JP | 2007-336116 A | 12/2007 |

OTHER PUBLICATIONS

The above foreign reference was cited in a Oct. 23, 2009 Chinese Office Action that issued in Chinese Patent Application No. 200710198557.0, which is enclosed with English Translation.

* cited by examiner

*Primary Examiner* — Yogesh Aggarwal
(74) *Attorney, Agent, or Firm* — Cowan, Liebowitz & Latman, P.C.

(57) ABSTRACT

The data transfer apparatus includes a recording unit which records image files on a first recording medium, a communication unit which communicates with a recording apparatus which records an image file on a second recording medium, and receives medium information associated with the second recording medium from the recording apparatus, a search unit which searches a plurality of image files recorded on the first recording medium for image files which are recordable on the second recording medium, based on the medium information, and a display control unit which displays representative images of the plurality of image files recorded on the first recording medium, and the display control unit displays, together with the representative images, information indicating a range of image files recordable on the second recording medium of the plurality of image files recorded on the first recording medium, based on a search result of the search unit.

15 Claims, 29 Drawing Sheets

F I G. 12C
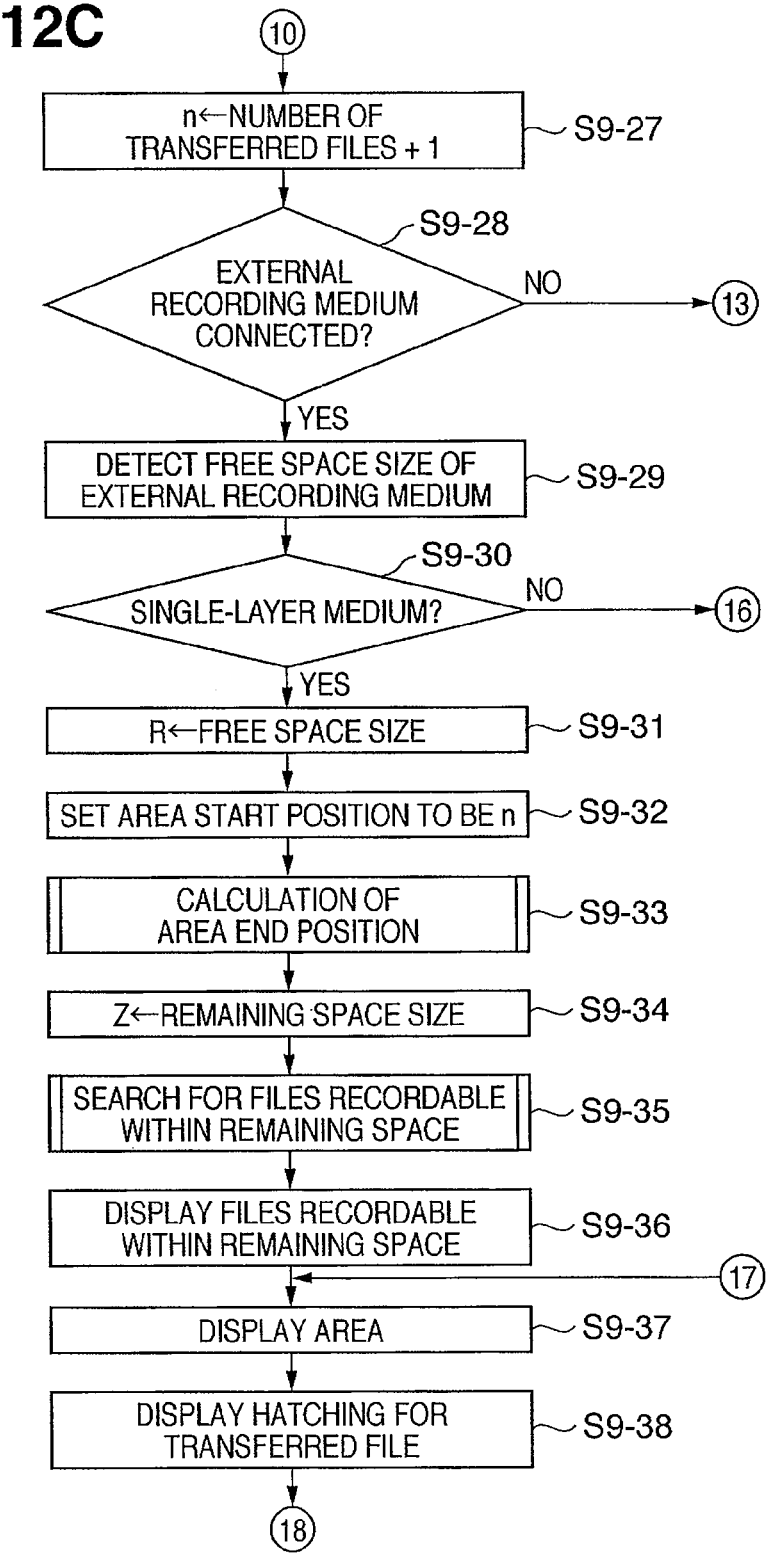

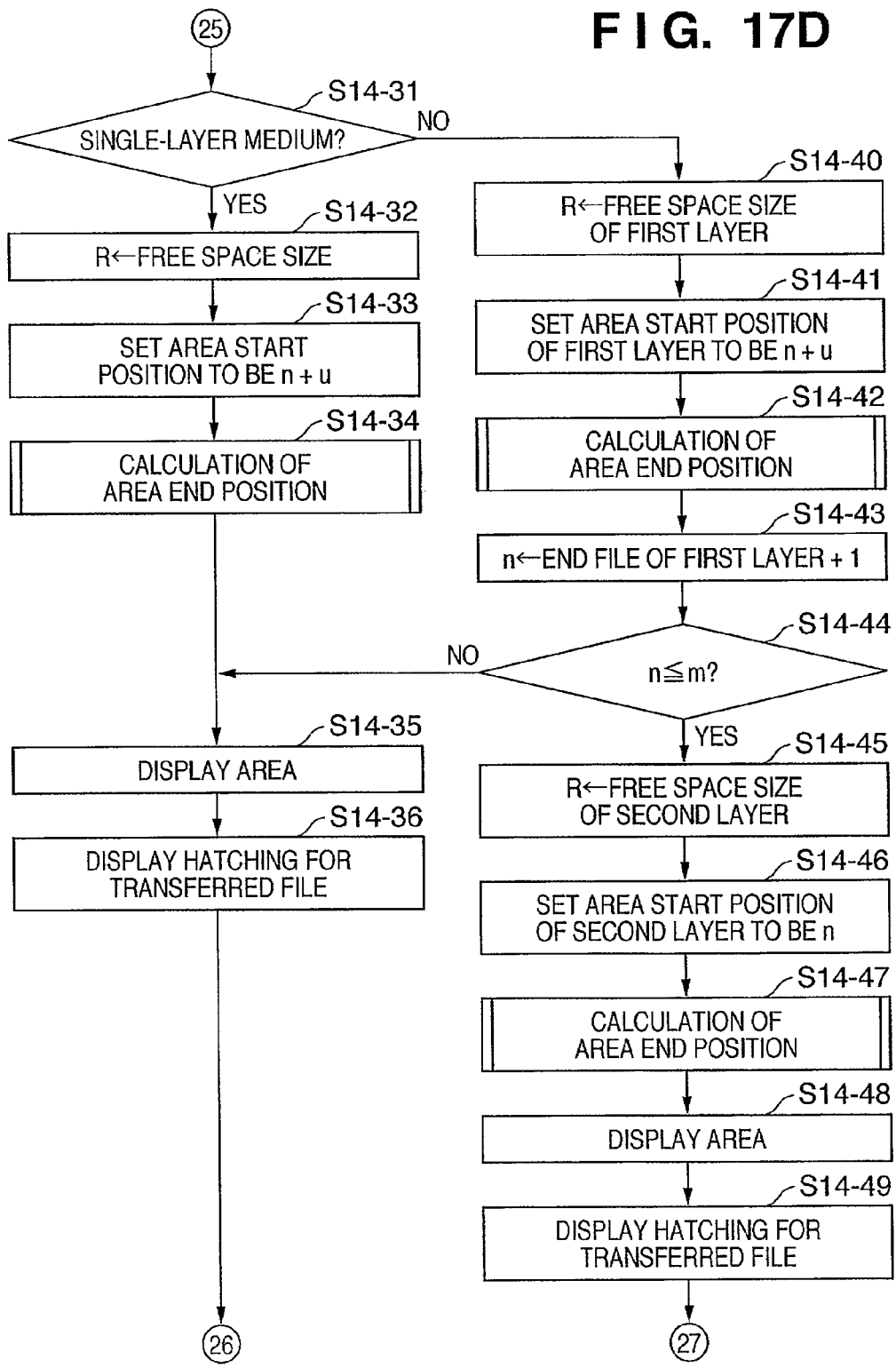

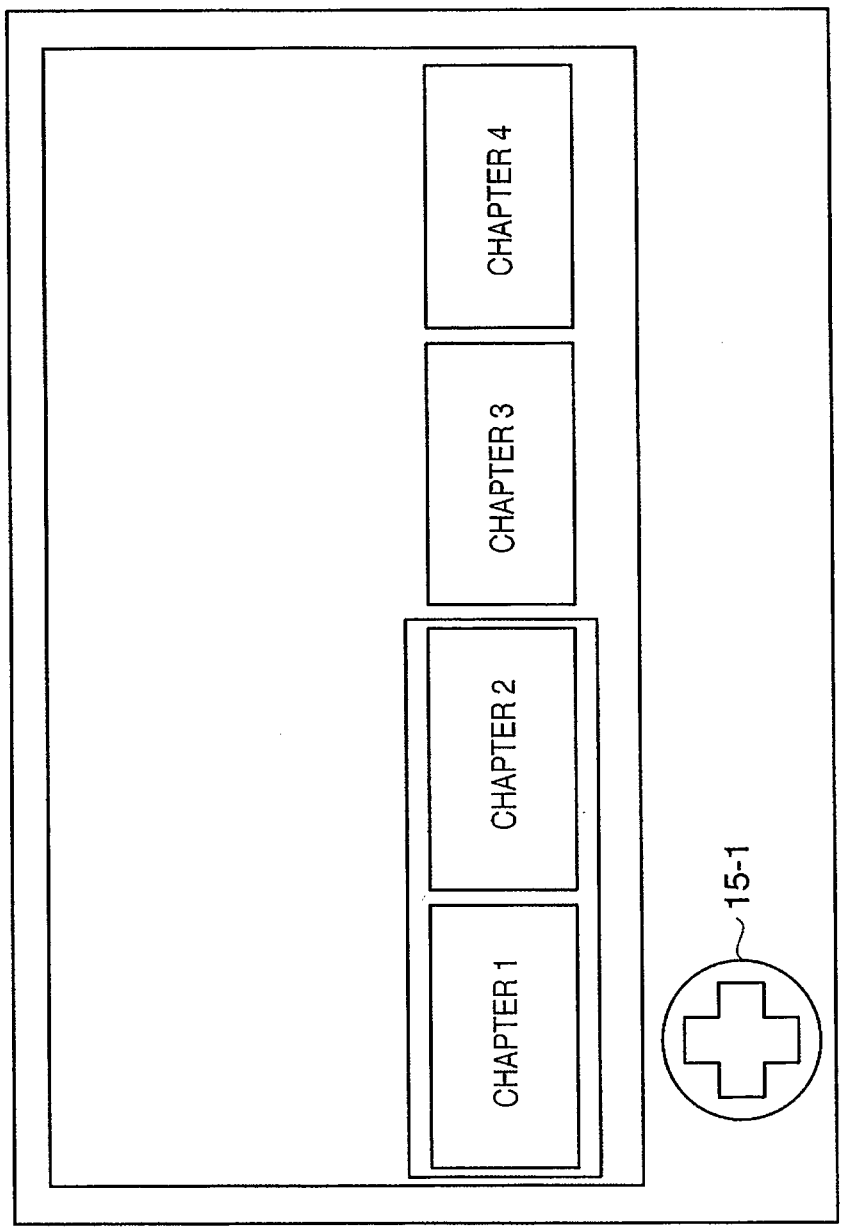

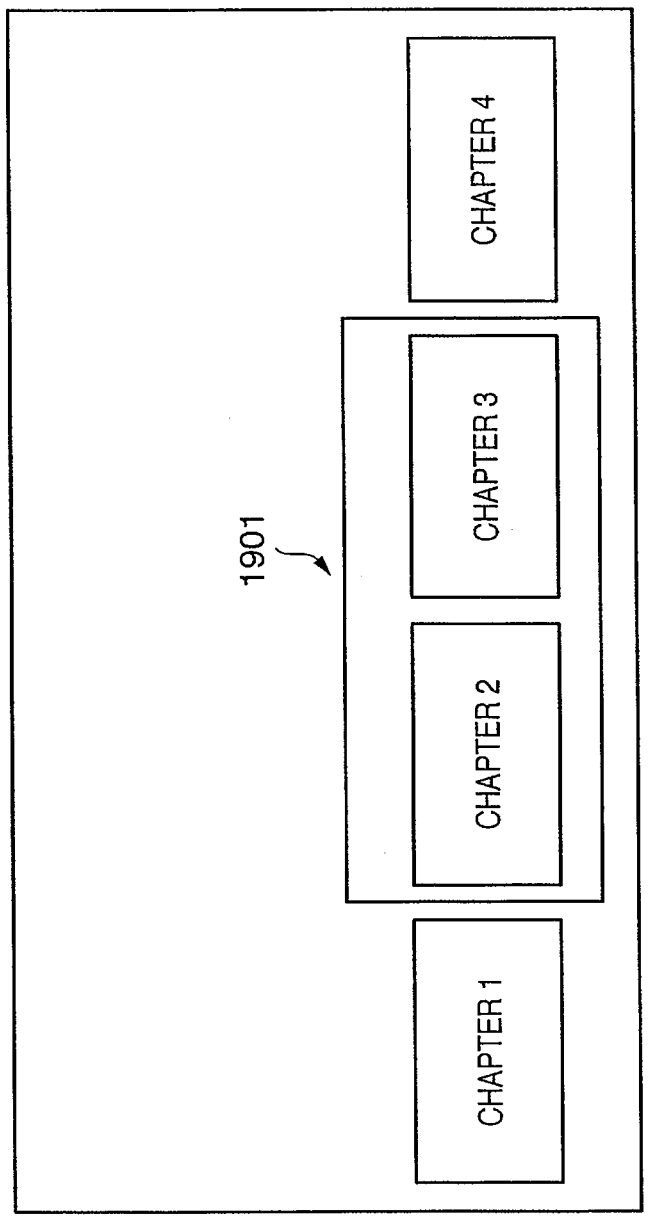

DATA TRANSFER APPARATUS, IMAGING APPARATUS, AND DATA TRANSFER SYSTEM

BACKGROUND OF THE INVENTION

1. Field of the Invention

The present invention relates to a data transfer apparatus, imaging apparatus, and data transfer system.

2. Description of the Related Art

In recent years, video cameras, each incorporating a large-capacity HDD (hard disk drive; to be referred to as a hard disk hereinafter), have become commercially available. This internal hard disk is normally used as a temporary storage medium of video data. By contrast, video data to be saved for a longer term including those to be backed up are often transferred from the internal hard disk to an external recording medium such as a DVD (Digital Versatile Disk) or the like. Note that the recording capacity of the internal hard disk is normally larger than that of the external recording medium.

As described in Japanese Patent Laid-Open No. 2005-85359, a technique for displaying, upon reception of a user's file selection instruction, the recording capacity of a transfer destination and information indicating whether or not the selected file can be transferred has been proposed.

However, with the technique described in Japanese Patent Laid-Open No. 2005-85359, whether or not each file can be transferred cannot be recognized unless a file is selected. For this reason, the user must select video data and instruct its transfer in consideration of the recording capacity of an external recording medium as a data transfer destination, and the operational load when transferring data to the external recording medium may increase.

SUMMARY OF THE INVENTION

The present invention provides a data transfer apparatus, imaging apparatus, and data transfer system, which can reduce the operational load when transferring data to a recording medium.

A data transfer apparatus according to the first aspect of the present invention comprises: a recording unit adapted to record image files on a first recording medium; a communication unit adapted to communicate with a recording apparatus which records an image file on a second recording medium, and to receive medium information associated with the second recording medium from the recording apparatus; a search unit adapted to search a plurality of image files recorded on the first recording medium for image files which are recordable on the second recording medium, based on the medium information received by the communication unit; and a display control unit adapted to display representative images of the plurality of image files recorded on the first recording medium on a display device, wherein the display control unit displays, together with the representative images, information indicating a range of image files recordable on the second recording medium of the plurality of image files recorded on the first recording medium, based on a search result of the search unit.

An imaging apparatus according to the second aspect of the present invention comprises: an imaging unit adapted to generate image data by capturing an image including an object; a recording unit adapted to record image files including image data generated by the imaging unit on a first recording medium; a communication unit adapted to communicate with a recording apparatus which records an image file on a second recording medium, and to receive medium information associated with the second recording medium from the recording apparatus; a search unit adapted to search the plurality of image files recorded on the first recording medium for image files which are recordable on the second recording medium, based on the medium information received by the communication unit; and a display control unit adapted to display representative images of a plurality of image files recorded on the first recording medium on a display device, wherein the display control unit displays information indicating a range of image files, which can be transferred from the first recording medium to the second recording medium of the plurality of image files recorded on the first recording medium, together with the representative images, based on a search result of the search unit.

A data transfer system according to the third aspect of the present invention is a data transfer system in which a data transfer apparatus and a recording apparatus are connected to each other to be able to communicate with each other, wherein the data transfer apparatus is a data transfer apparatus according to the first aspect of the present invention.

According to the present invention, the operational load when transferring data to a recording medium can be reduced.

Further features of the present invention will become apparent from the following description of exemplary embodiments with reference to the attached drawings.

BRIEF DESCRIPTION OF THE DRAWINGS

FIGS. 12A to 12D are flowcharts showing the sequence of processing executed when the data transfer system transfers data (working example 2);

FIGS. 17A to 17D are flowcharts showing the sequence of processing executed when the data transfer system transfers data (working example 3);

FIG. 18 shows an example of a panel of a video camera;

FIG. 19 shows an example of a window displayed on the display device; and

DESCRIPTION OF THE EMBODIMENTS

Figure 1:
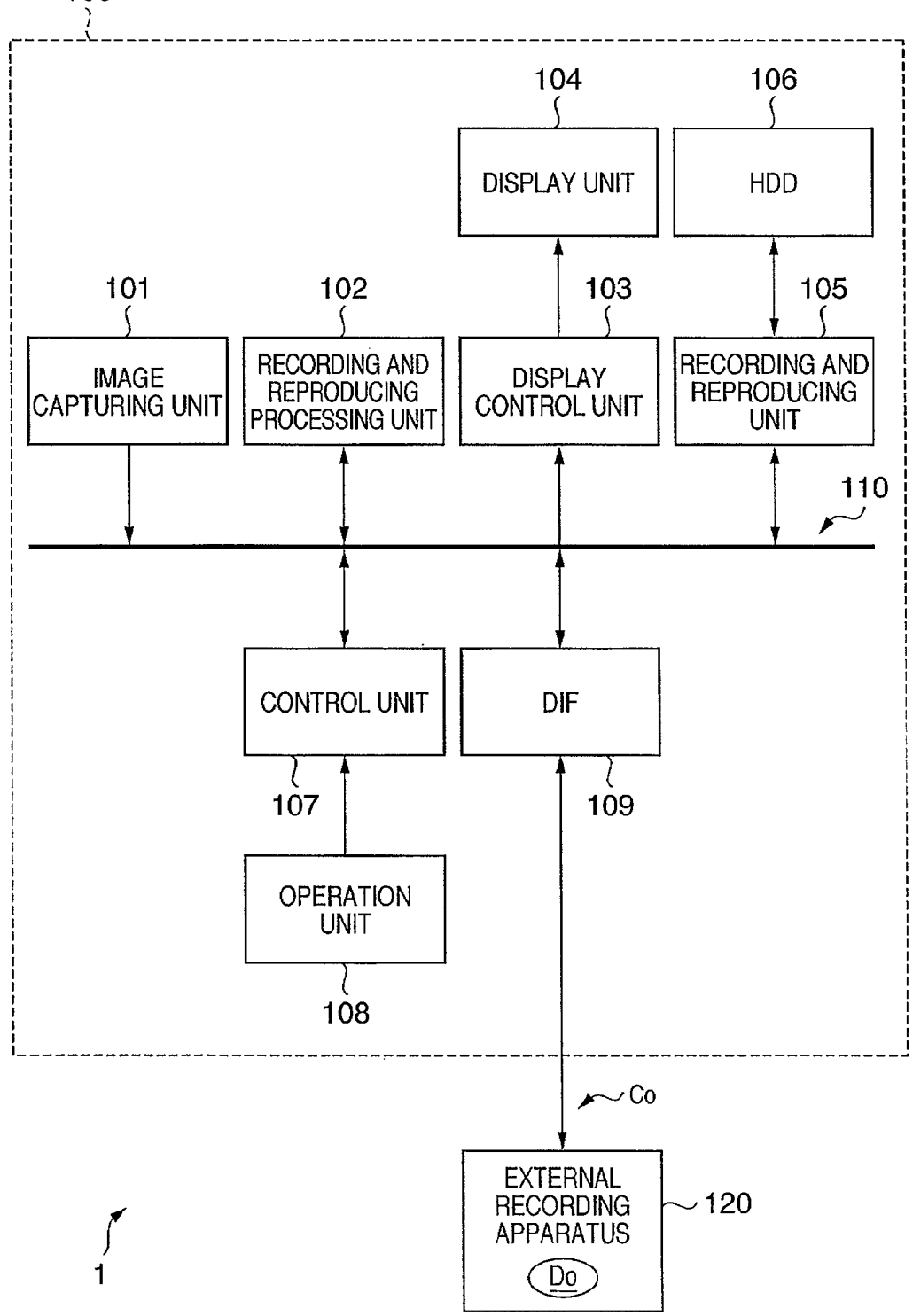
FIG. 1 is a block diagram showing the arrangement of a data transfer system according to one embodiment of the present invention.

A data transfer system 1 according to one embodiment of the present invention will be described below with reference to FIG. 1. FIG. 1 is a block diagram showing the arrangement of the data transfer system 1 according to the embodiment of the present invention.

The data transfer system 1 transfers image data recorded on an internal recording medium for the purpose of long-term storage (e.g., dubbing or backup). The data transfer system 1 comprises a video camera (data transfer apparatus, imaging apparatus) 100, external recording apparatus 120, and communication cable (communication medium) C0.

The video camera 100 incorporates a hard disk.

The external recording apparatus 120 is connected to the video camera 100 via the communication cable C0 to be able to communicate with each other. The external recording apparatus 120 can record information (e.g., image data) received from the video camera 100 on a detachable external recording medium (second recording medium) D0. Or the external recording apparatus 120 can reproduce information recorded on the loaded external recording medium (second recording medium) D0 and can supply the reproduced information to the video camera 100. The external recording medium D0 includes, for example, a disk-shaped high-density recording medium such as a DVD+/−R (single- or dual-layer medium), DVD+/−RW, and the like, or a card-shaped high-density recording medium such as a flash memory card and the like.

The communication cable C0 connects the video camera 100 and external recording apparatus 120. The communication cable C0 is a serial cable used to make, for example, serial communications, and is, for example, a USB (Universal Serial Bus) cable.

The arrangement and operation of the video camera 100 will be explained below with reference to FIG. 1.

The video camera 100 shown in FIG. 1 comprises an imaging unit 101, recording and reproducing processing unit 102, display control unit 103, display device 104, recording and reproducing unit (search unit and detection unit) 105, and control unit 107. The video camera 100 also comprises an operation unit (input unit) 108 and bus 110. Furthermore, the video camera 100 comprises a hard disk drive (to be abbreviated as an HDD hereinafter; a first recording medium and storage unit) 106 and digital interface (to be abbreviated as a DIF hereinafter; a communication unit, detection unit, and transfer unit) 109.

The imaging unit 101, recording and reproducing processing unit 102, display control unit 103, recording and reproducing unit 105, control unit 107, and DIF 109 are connected to each other via the bus 110. The display device 104 is connected to the display control unit 103. The HDD 106 is connected to the recording and reproducing unit 105. The operation unit 108 is connected to the control unit 107. The DIF 109 is connected to the external recording apparatus 120 via the communication cable C0.

The operation of the video camera 100 upon photographing will be explained below.

The user inputs a photographing start instruction to the operation unit 108. The operation unit 108 supplies the photographing start instruction to the control unit 107. The control unit 107 outputs control signals to the respective units via the bus 110 based on the photographing start instruction. In response to the control signals, the respective units start a photographing process as follows.

The imaging unit 101 generates an image signal by capturing an image of an object (not shown), and converts that image signal into image data (moving image data). The imaging unit 101 outputs the image data to the recording and reproducing processing unit 102 via the bus 110. The recording and reproducing processing unit 102 encodes the image data according to a known encoding method such as MPEG or the like, and supplies the encoded image data to the recording and reproducing unit 105 via the bus 110. The recording and reproducing unit 105 records the encoded image data on the HDD 106.

The imaging unit 101 also supplies the image data to the display control unit 103 via the bus 110. The display control unit 103 displays an image corresponding to the image data on the display device 104. Note that the display device 104 serves as a viewfinder.

Then, the user inputs a photographing stop instruction to the operation unit 108. The operation unit 108 supplies the photographing stop instruction to the control unit 107. The control unit 107 outputs control signals to the respective units via the bus 110 based on the photographing stop instruction. In response to the control signals, the respective units stop the photographing process as follows.

The recording and reproducing processing unit 102 encodes the image data, and generates information indicating the end of a file (to be referred to as EOF hereinafter). The recording and reproducing processing unit 102 appends the EOF to the encoded image data, and supplies that image data to the recording and reproducing unit 105. The recording and reproducing unit 105 closes, as one file, image data which are kept recorded on the HDD 106 from when the photographing process has started until it receives the EOF, and records that image file on the HDD 106. That is, the image file is a set of image data. The recording and reproducing unit 105 updates file management information in response to recording of that image file on the HDD 106. The file management information includes identification information of the image file, information associated with the data size of the image file (data size information), and information associated with the storage address of the image file. The recording and reproducing unit 105 controls read and write accesses of information in the HDD 106 based on the file management information.

The recording and reproducing unit 105 supplies that image file to the recording and reproducing processing unit 102 via the bus 110. The recording and reproducing processing unit 102 extracts one frame from image data of each image file, and generates representative image data (thumbnail image data, still image data) using the extracted image data. Note that this embodiment manages each image file as one chapter, and manages one or more chapters as one title. The recording and reproducing processing unit 102 supplies representative image data of respective chapters to the recording and reproducing unit 105. The recording and reproducing unit 105 records the representative image data of the chapters on the HDD 106 in association with that image file.

The operation of the video camera 100 upon reproduction will be described below.

The user inputs a reproduction list display instruction to the operation unit 108. The operation unit 108 supplies the reproduction list display instruction to the control unit 107. The control unit 107 outputs control signals to the respective units via the bus 110 based on the reproduction list display instruction. In response to the control signals, the respective units start a reproduction list display process as follows.

The recording and reproducing unit 105 reproduces representative image data of respective chapters of the image file recorded on the HDD 106, and supplies them to the display control unit 103. The display control unit 103 generates list window data of these representative image data, and displays a list window corresponding to the list window data on the display device 104. The list window includes representative images having one-to-one correspondence with image files, and serves as a reproduction list of image files.

The user inputs, to the operation unit 108, a representative image selection instruction for selecting a desired representative image from those displayed on the display device 104. The operation unit 108 supplies the representative image selection instruction to the control unit 107. The control unit 107 outputs control signals to the respective units via the bus 110 based on the representative image selection instruction. In response to the control signals, the respective units stop a representative image selection process as follows.

The recording and reproducing unit 105 reads out an image file related to the selected representative image from the HDD 106, and reproduces the image file corresponding to the representative image. The recording and reproducing unit 105 supplies the reproduced image file to the recording and reproducing processing unit 102. The recording and reproducing processing unit 102 decodes the reproduced image file, and supplies data of the decoded image file to the display control unit 103. The display control unit 103 displays an image (moving image) corresponding to the data of the decoded image file on the display device 104.

The operation of the video camera 100 upon data transfer (e.g., dubbing or backup) will be described below.

The user inputs a data transfer request instruction to the operation unit 108. The operation unit 108 passes the data transfer request instruction to the control unit 107. The control unit 107 outputs control signals to the respective units via the bus 110 based on the data transfer request instruction. In response to the control signals, the respective units start a medium detection process as follows.

The DIF 109 receives medium information from the external recording apparatus 120 via the communication cable C0. The medium information includes information associated with the unique ID (medium identification information), type, recordable capacity (recordable time period), and recordable format of the external recording medium D0. The DIF 109 supplies the medium information to the recording and reproducing unit 105.

Then, the user inputs, to the operation unit 108, a representative image selection instruction for selecting a desired representative image from those displayed on the display device 104. Note that the representative image selection instruction also serves as an instruction for selecting an image file to be transferred. The operation unit 108 supplies the representative image selection instruction to the control unit 107. The control unit 107 outputs control signals to the respective units via the bus 110 based on the representative image selection instruction. In response to the control signals, the respective units starts a data transfer process as follows.

The recording and reproducing unit 105 reads out an image file related to the selected representative image from the HDD 106, and supplies that image file to the DIF 109. The DIF 109 supplies the image file to the external recording apparatus 120 via the communication cable C0. In this way, the external recording apparatus 120 records the image file on the external recording medium D0.

WORKING EXAMPLE 1

A detailed operation example of the video camera 100 upon data transfer will be described as working example 1 with reference to FIGS. 2A to 7. FIGS. 2A to 2D are flowcharts showing the sequence of processing executed when the data transfer system 1 transfers data. FIG. 3 is a flowchart showing the sequence of a calculation subroutine of the end position of an image file range. FIGS. 4 to 7 show examples of windows displayed on the display device 104.

Figure 2A:
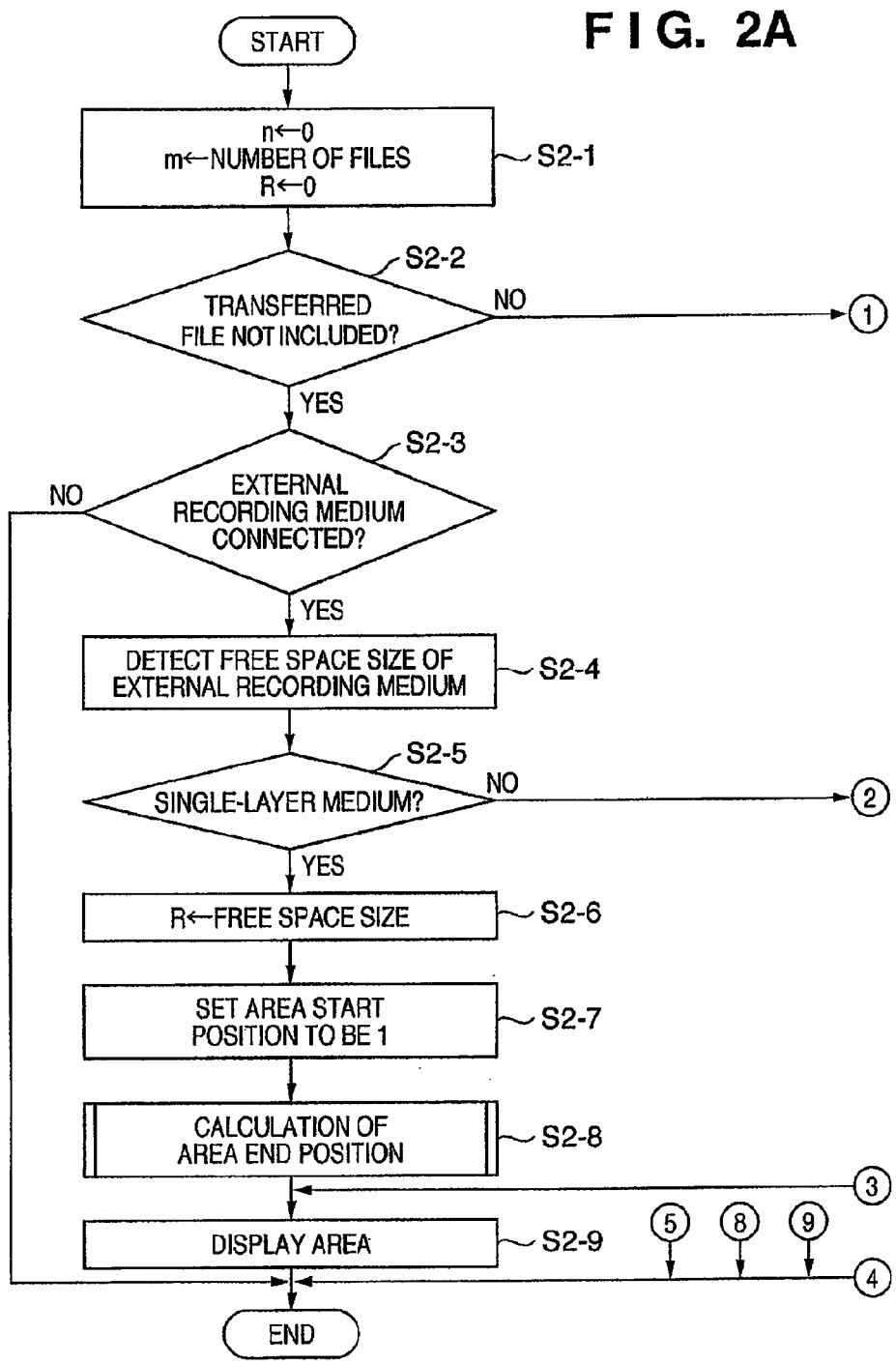
FIGS. 2A to 2D are flowcharts showing the sequence of processing executed when the data transfer system transfers data (working example 1)
Figure 2B:
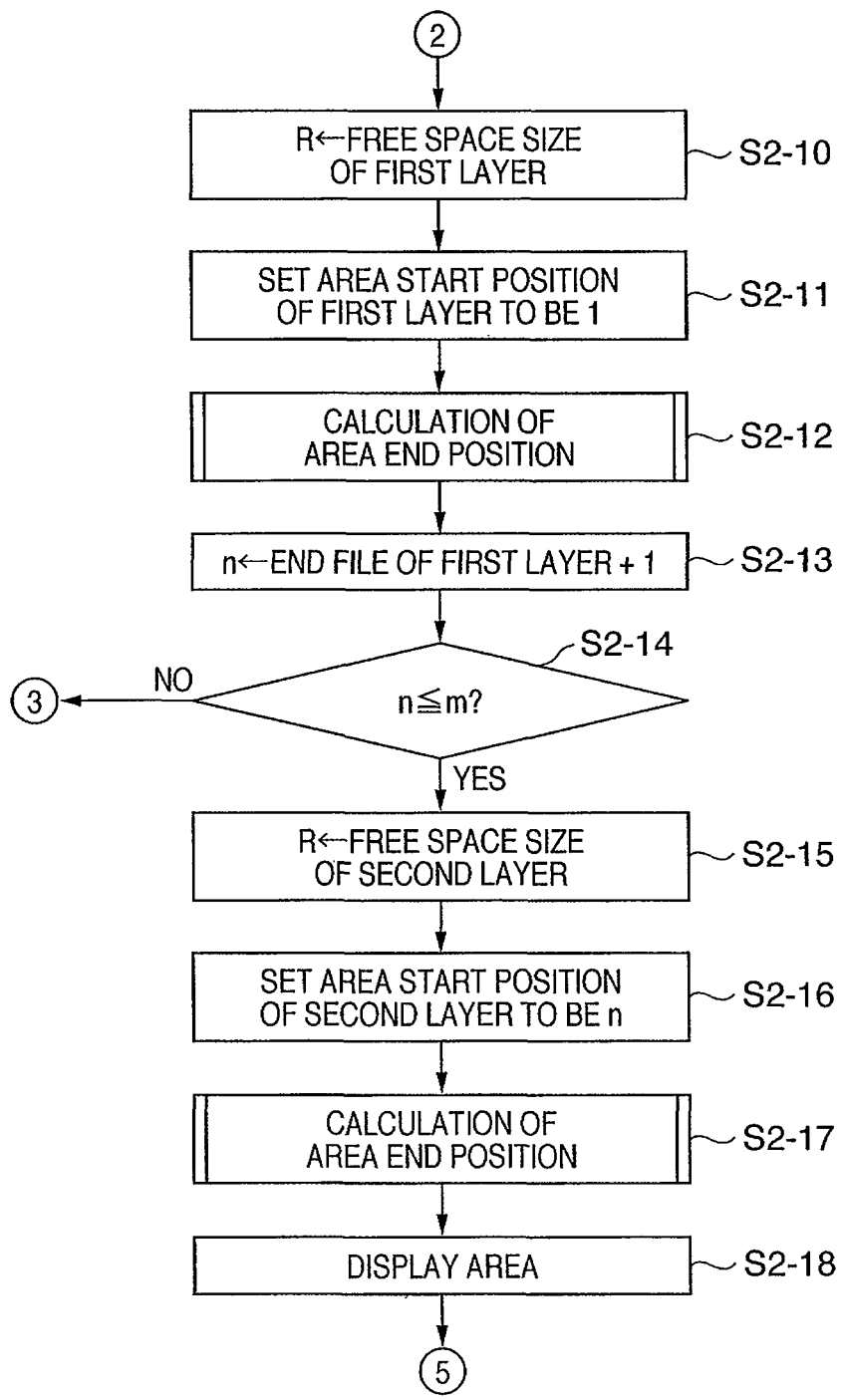
Figure 2C:
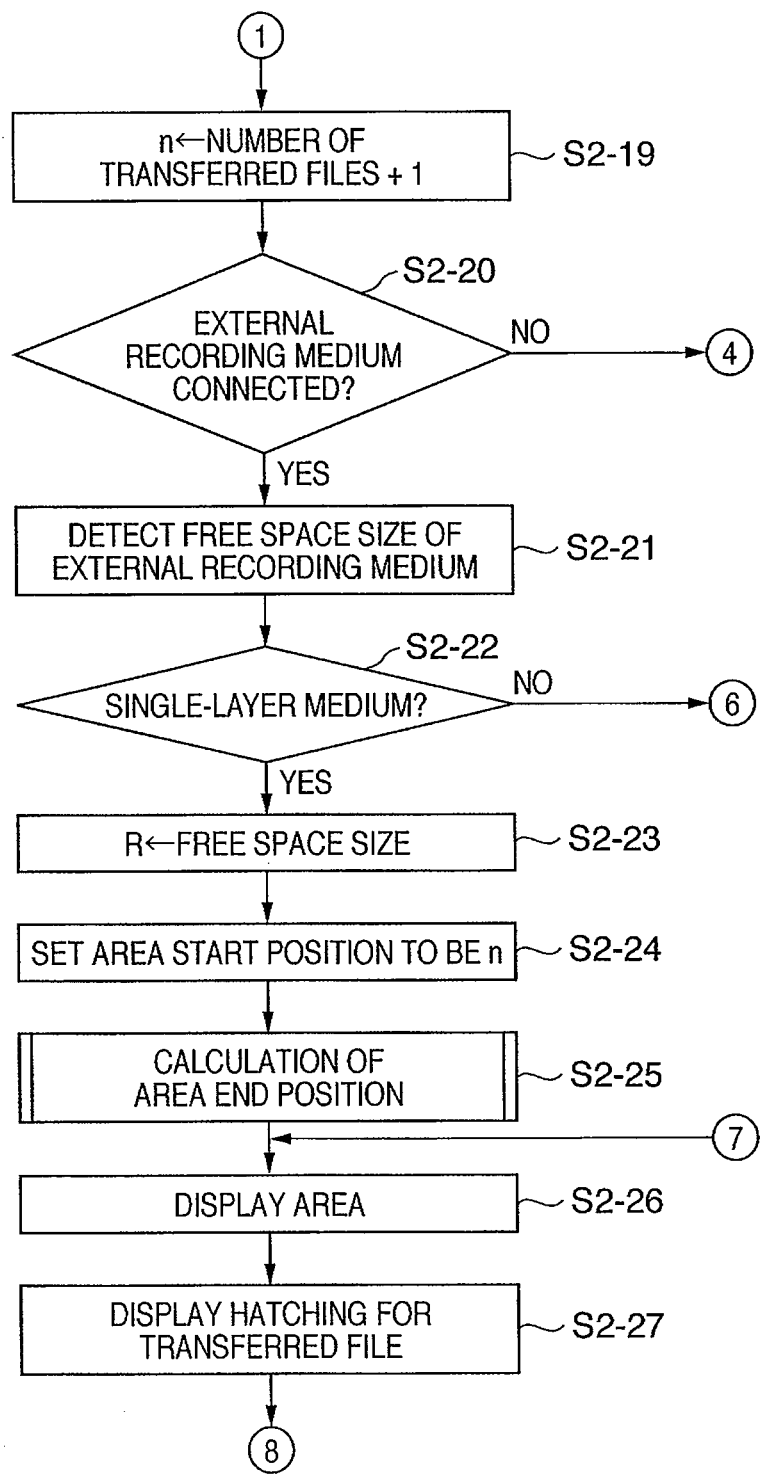
Figure 2D:
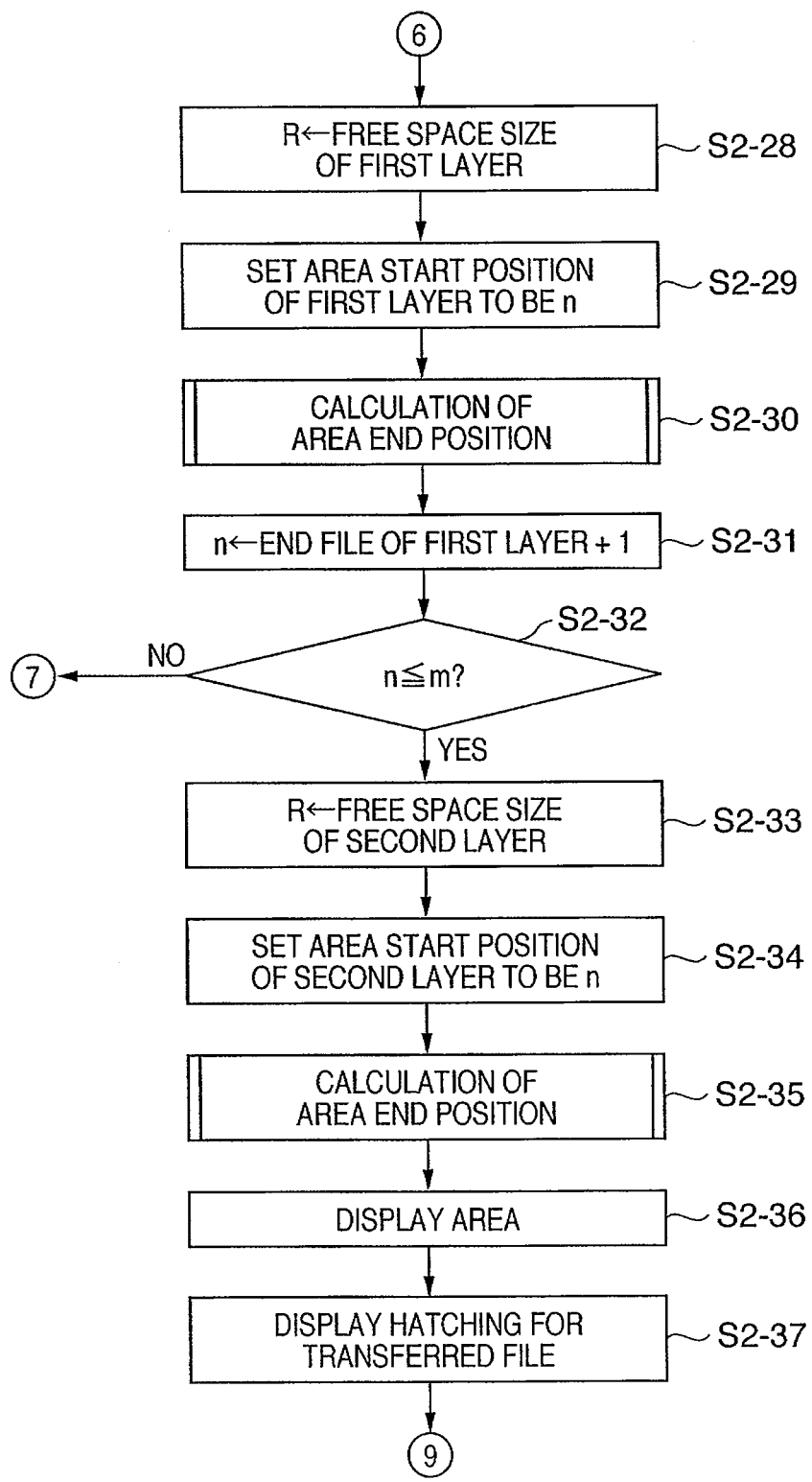
Figure 3:
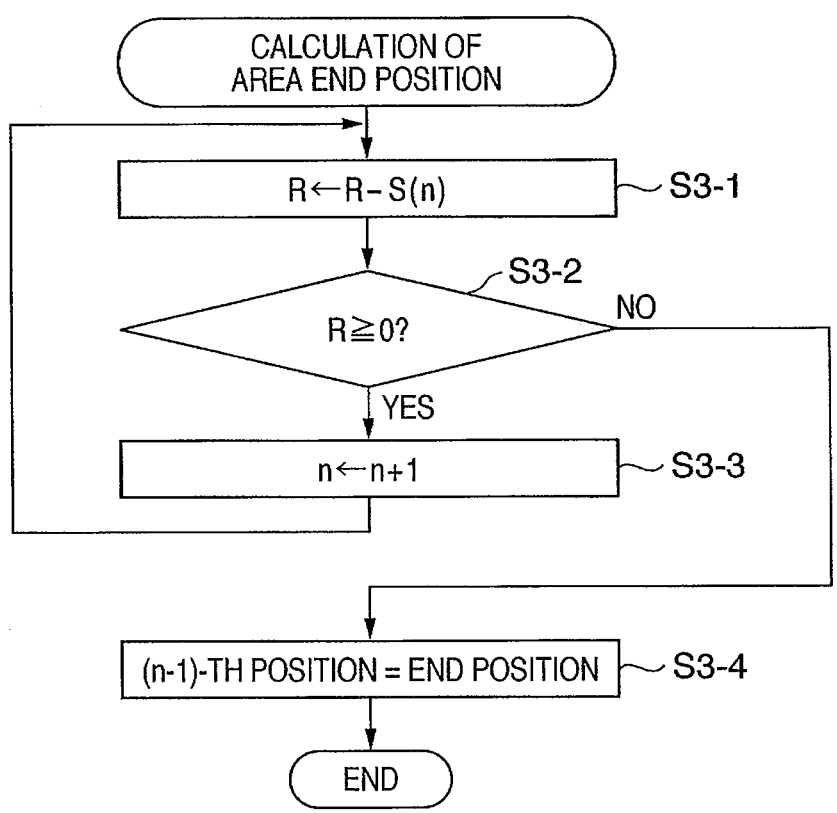
FIG. 3 is a flowchart showing the sequence of a calculation subroutine of the end position of an image file range.

In step S2-1 shown in FIG. 2A, the control unit 107 sets the number of all files reproduced by the recording and reproducing unit 105 in a variable m, sets zero in a variable n, and sets zero in a variable R, thus initializing the respective variables.

The control unit 107 checks in step S2-2 if files recorded on the recording medium include a file which has already been transferred. If the control unit 107 determines that there is no file which has already been transferred, the process advances to step S2-3; otherwise, the process advances to step S2-19.

The DIF 109 checks in step S2-3 if the external recording medium is connected. If the DIF 109 receives medium information from the external recording apparatus 120 via the communication cable C0, it decides that the external recording medium is connected; otherwise, it decides that the external recording medium is not connected. If the DIF 109 decides that the external recording medium is connected, the process advances to step S2-4; otherwise, the processing ends.

In step S2-4, the DIF 109 supplies the medium information to the recording and reproducing unit 105. The recording and reproducing unit 105 detects the free space size of the detected external recording medium based on the medium information. Hereinafter, the term "free space" means actual free space for recording data on a medium.

The recording and reproducing unit 105 checks in step S2-5 based on the medium information if the external recording medium is a single-layer recording medium (a recording medium having one recording layer). If the recording and reproducing unit 105 decides that the external recording medium is a single-layer recording medium, the process advances to step S2-6. If the recording and reproducing unit 105 decides that the external recording medium is not a single-layer recording medium (e.g., a dual-layer recording medium), the process advances to step S2-10. Note that the dual-layer recording medium has two recording layers.

In step S2-6, the recording and reproducing unit 105 substitutes the free space size detected in step S2-4 in the variable R.

In step S2-7, the recording and reproducing unit 105 sets the start position of the range of image files which are recordable on the external recording medium to be 1.

In step S2-8, the recording and reproducing unit 105 executes a subroutine for calculating the end position of the range of recordable image files (that is "area end position") (see FIG. 3).

In step S3-1 of the subroutine shown in FIG. 3, the recording and reproducing unit 105 sets a new value obtained by subtracting a size S(n) of the n-th file from the variable R (free space size) in the variable R.

The recording and reproducing unit 105 checks in step S3-2 of the subroutine if the variable R is equal to or larger than 0. If the recording and reproducing unit 105 decides that the variable R is equal to or larger than 0, that is, that all of the first to n-th image files are recordable on the external recording medium, the subroutine advances to step S3-3. If the recording and reproducing unit 105 decides that the variable R is not equal to or larger than 0, that is, that the first to n-th image files cannot be recorded on the external recording medium, the subroutine advances to step S3-4.

In step S3-3 of the subroutine, the recording and reproducing unit 105 increments the variable n, and the subroutine returns to step S3-1.

In step S3-4 of the subroutine, the recording and reproducing unit 105 determines the (n−1)-th file as the end position of the range of image files which are recordable on the external recording medium, thus ending the subroutine.

In step S2-9 shown in FIG. 2A, the recording and reproducing unit 105 supplies the information set in step S2-7 and that calculated in step S2-8 to the display control unit 103. The display control unit 103 displays, on the display device 104, the range of recordable image files to be identifiable from other image files based on these pieces of information (see FIG. 4).

Figure 4:
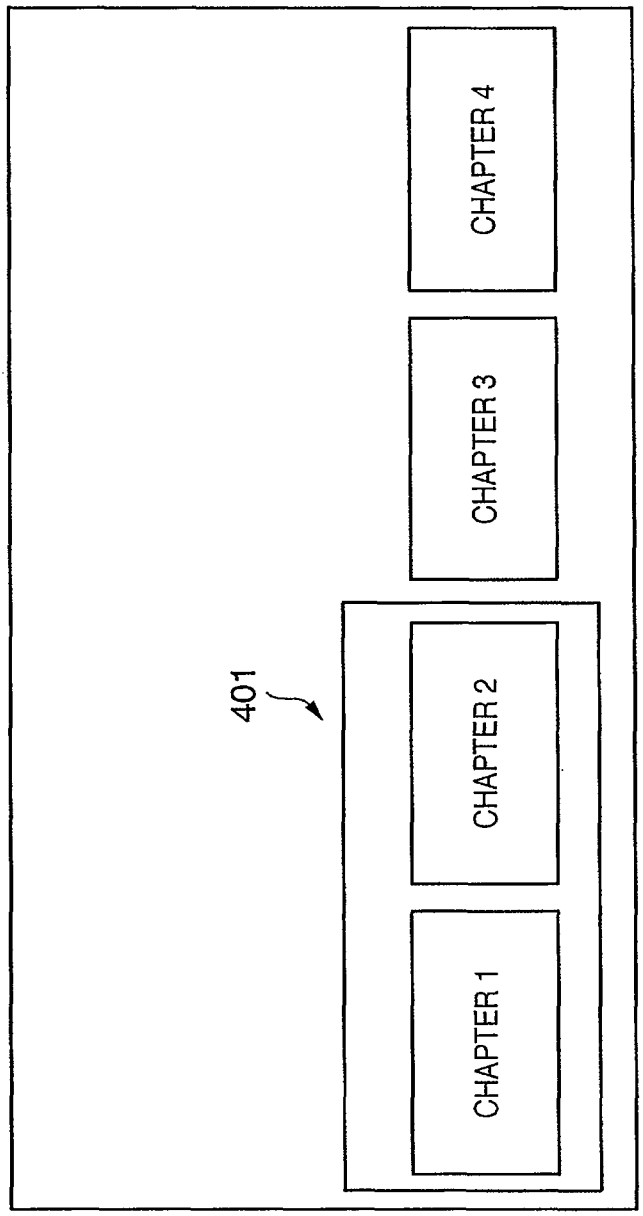
FIG. 4 shows an example of a window displayed on a display device.

For example, as shown in FIG. 4, the display control unit 103 displays the range of image files recordable on the external recording medium on the display device 104 by bounding, by a frame 401, representative images "chapter 1" and "chapter 2" of representative images "chapter 1" to "chapter 4".

Note that the display control unit 103 may display representative images in a recording order (an order in turn from older recording times) or an inverse recording order (an order in turn from newer recording times). Alternatively, the display control unit 103 may display representative images in an order of data sizes or an order of recording time durations. When the user inputs a display order instruction of representative images, the display control unit 103 may receive that instruction via the control unit 107, and may display representative images in the display order designated by the instruction.

In this case, for example, image files recorded on the HDD 106 may be sorted in the designated order, and the process in FIG. 3 may be executed in turn from the first image file of the sort result.

In step S2-10, the recording and reproducing unit 105 substitutes the free space size of the first layer in the variable R.

In step S2-11, the recording and reproducing unit 105 sets the start position of a range of image files which are recordable in the first layer of the external recording medium to be 1.

In step S2-12, the recording and reproducing unit 105 executes the subroutine for calculating the end position of the range of image files which are recordable in the first layer (see FIG. 3).

In step S2-13, the recording and reproducing unit 105 substitutes "the end position of the range of image files which are recordable in the first layer"+1 in n.

The recording and reproducing unit 105 checks in step S2-14 if the variable n is equal to or smaller than m, that is, if all files are stored in the first layer. If the recording and reproducing unit 105 decides that the variable n is equal to or smaller than m, that is, that all files are not stored in the first layer, the process advances to step S2-15. If the recording and reproducing unit 105 decides that the variable n is not equal to or smaller than m, that is, that all files are stored in the first layer, the process advances to step S2-9.

In step S2-15, the recording and reproducing unit 105 substitutes the free space size of the second layer in the variable R.

In step S2-16, the recording and reproducing unit 105 sets the start position of a range of image files which are recordable in the second layer of the external recording medium to be n.

In step S2-17, the recording and reproducing unit 105 executes the subroutine for calculating the end position of the range of image files which are recordable in the second layer (see FIG. 3).

In step S2-18, the recording and reproducing unit 105 supplies pieces of information set in steps S2-11 and S2-16, and those calculated in steps S2-12 and S2-17 to the display control unit 103. The display control unit 103 displays, on the display device 104, the range of image files which are recordable in the first layer and that of image files which are recordable in the second layer, based on these pieces of information (see FIG. 5).

Figure 5:
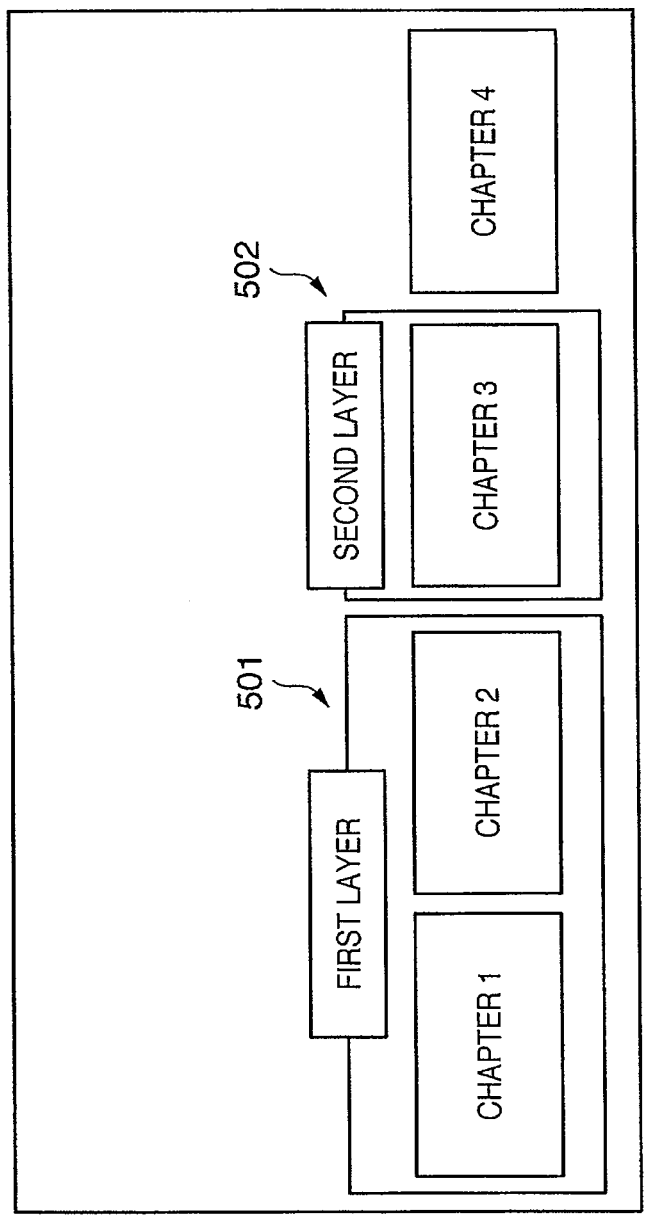
FIG. 5 shows an example of a window displayed on the display device.

For example, as shown in FIG. 5, the display control unit 103 bounds, by a frame 501 of the first layer, representative images "chapter 1" and "chapter 2" of representative images "chapter 1" to "chapter 4", and bounds a representative image "chapter 3" by a frame 502 of the second layer. In this way, the display control unit 103 displays, on the display device 104, the range of image files which are recordable in the first layer and that of image files which are recordable in the second layer.

Note that the display control unit 103 may display representative images in a recording order (an order in turn from older recording times) or an inverse recording order (an order in turn from newer recording times). Alternatively, the display control unit 103 may display representative images in an order of data sizes or an order of recording time durations. When the user inputs a display order instruction of representative images, the display control unit 103 may receive that instruction via the control unit 107, and may display representative images in the display order designated by the instruction.

In this case, for example, image files recorded in the HDD 106 may be sorted in the designated order, and the process in FIG. 3 may be executed in turn from the first image file of the sort result.

In step S2-19, the recording and reproducing unit 105 substitutes "the number of transferred files"+1 in the variable n.

The DIF 109 checks in step S2-20 if the external recording medium is connected. If the DIF 109 receives medium information from the external recording apparatus 120 via the communication cable C0, it decides that the external recording medium is connected; otherwise, it decides that the external recording medium is not connected. If the DIF 109 decides that the external recording medium is connected, the process advances to step S2-21; otherwise, the processing ends.

In step S2-21, the DIF 109 supplies the medium information to the recording and reproducing unit 105. The recording and reproducing unit 105 detects the free space size of the detected external recording medium based on the medium information.

The recording and reproducing unit 105 checks in step S2-22 based on the medium information if the external recording medium is a single-layer recording medium. If the recording and reproducing unit 105 decides that the external recording medium is a single-layer recording medium, the process advances to step S2-23. If the recording and reproducing unit 105 decides that the external recording medium is not a single-layer recording medium, the process advances to step S2-28.

In step S2-23, the recording and reproducing unit 105 substitutes the free space size detected in step S2-21 in the variable R.

In step S2-24, the recording and reproducing unit 105 sets the start position of a range of recordable image files to be n.

In step S2-25, the recording and reproducing unit 105 executes the subroutine for calculating the end position of the range of recordable image files (see FIG. 3).

In step S2-26, the recording and reproducing unit 105 supplies the information set in step S2-24 and that calculated in step S2-25 to the display control unit 103. The display control unit 103 displays, on the display device 104, the range of recordable image files from the head of a non-transferred file based on these pieces of information (see FIG. 6).

Figure 6:
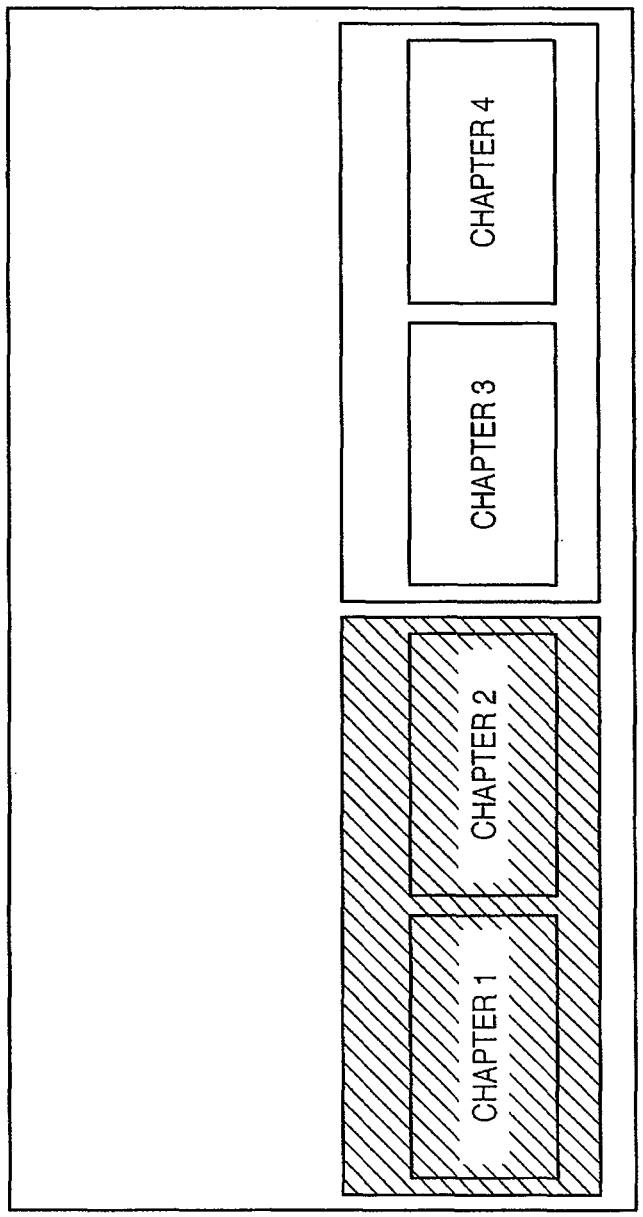
FIG. 6 shows an example of a window displayed on the display device.

In step S2-27, the display control unit 103 displays a hatching for transferred files on the display device 104 (see FIG. 6).

In step S2-28, the recording and reproducing unit 105 substitutes the free space size of the first layer in the variable R.

In step S2-29, the recording and reproducing unit 105 sets the start position of the range of image files which are recordable in the first layer to be n.

In step S2-30, the recording and reproducing unit 105 executes the subroutine for calculating the end position of the range of image files which are recordable in the first layer (see FIG. 3).

In step S2-31, the recording and reproducing unit 105 substitutes "the end position of the range of image files which are recordable in the first layer"+1 in the variable n.

The recording and reproducing unit 105 checks in step S2-32 if the variable n is equal to or smaller than m, that is, if all files are stored in the first layer. If the recording and reproducing unit 105 decides that the variable n is equal to or smaller than m, that is, that all files are not stored in the first layer, the process advances to step S2-33. If the recording and reproducing unit 105 decides that the variable n is not equal to or smaller than m, that is, that all files are stored in the first layer, the process advances to step S2-26.

In step S2-33, the recording and reproducing unit 105 substitutes the free space size of the second layer in the variable R.

In step S2-34, the recording and reproducing unit 105 sets the start position of the range of image files which are recordable in the second layer to be n.

In step S2-35, the recording and reproducing unit 105 executes the subroutine for calculating the end position of the range of image files which are recordable in the second layer (see FIG. 3).

In step S2-36, the recording and reproducing unit 105 supplies pieces of information set in steps S2-29 and S2-34, and those calculated in steps S2-30 and S2-35 to the display control unit 103. The display control unit 103 displays, on the display device 104, the ranges of recordable image files based on these pieces of information, so that the user can identify the range of image files which are recordable in the first layer and that of image files which are recordable in the second layer (see FIG. 7).

Figure 7:
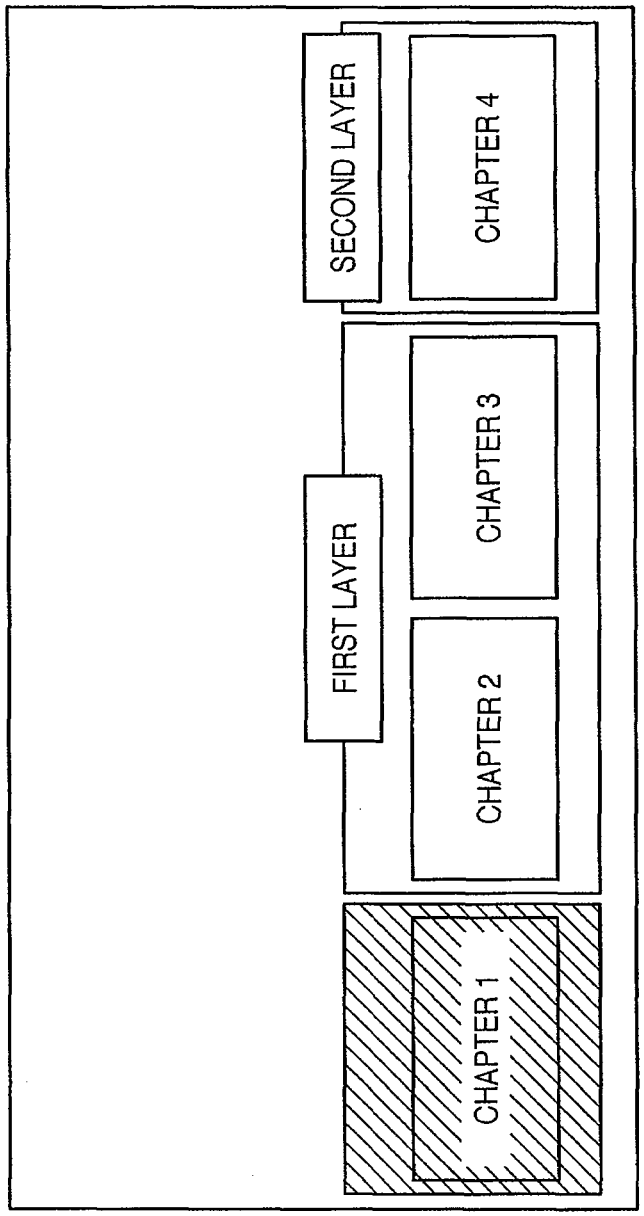
FIG. 7 shows an example of a window displayed on the display device.

In step S2-37, the display control unit 103 displays a hatching for a transferred file on the display device 104 (see FIG. 7).

As described above, this working example has exemplified the case wherein the range of image files recordable on the external recording medium of those which are recorded on the HDD 106 is displayed by bounding that range by the frame (see FIGS. 4 to 7). That is, since the recording capacity of the connected external recording medium is acquired before transfer, and the range of image files recordable on the external recording medium is identifiably displayed, the user can confirm up to which of image files recorded on the HDD 106 he or she can record on the external recording medium. In this way, the operational load when transferring data to the external recording medium can be reduced.

Figure 8:
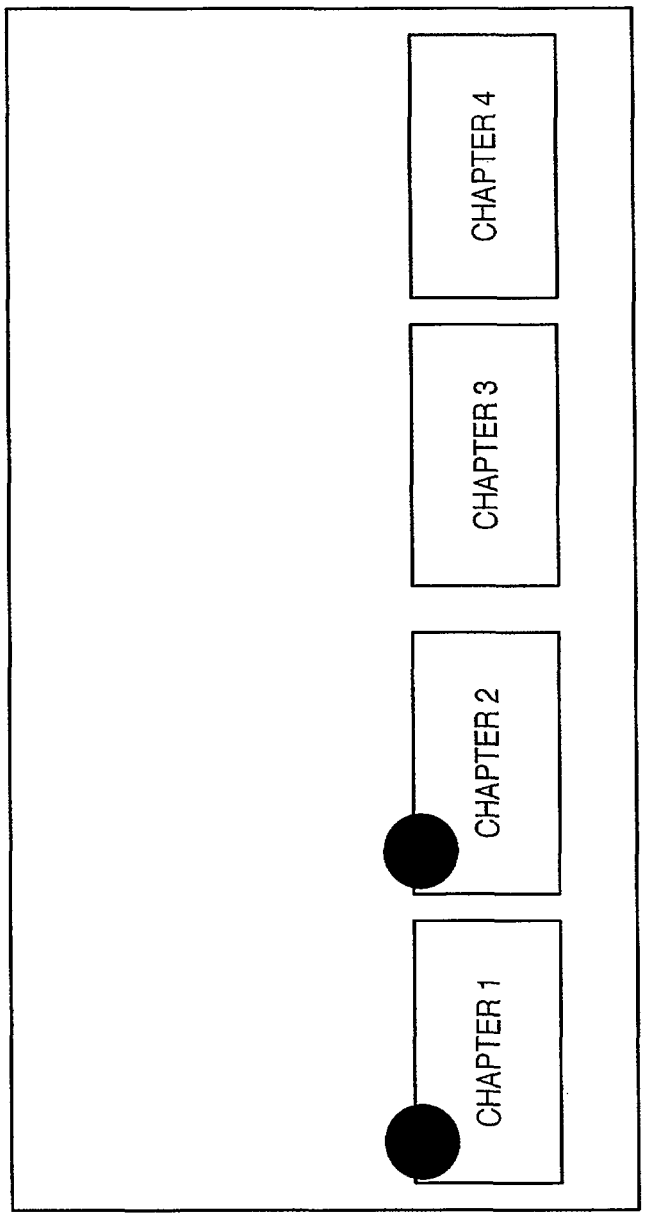
FIG. 8 shows an example of a window displayed on the display device (modified example)
Figure 9:
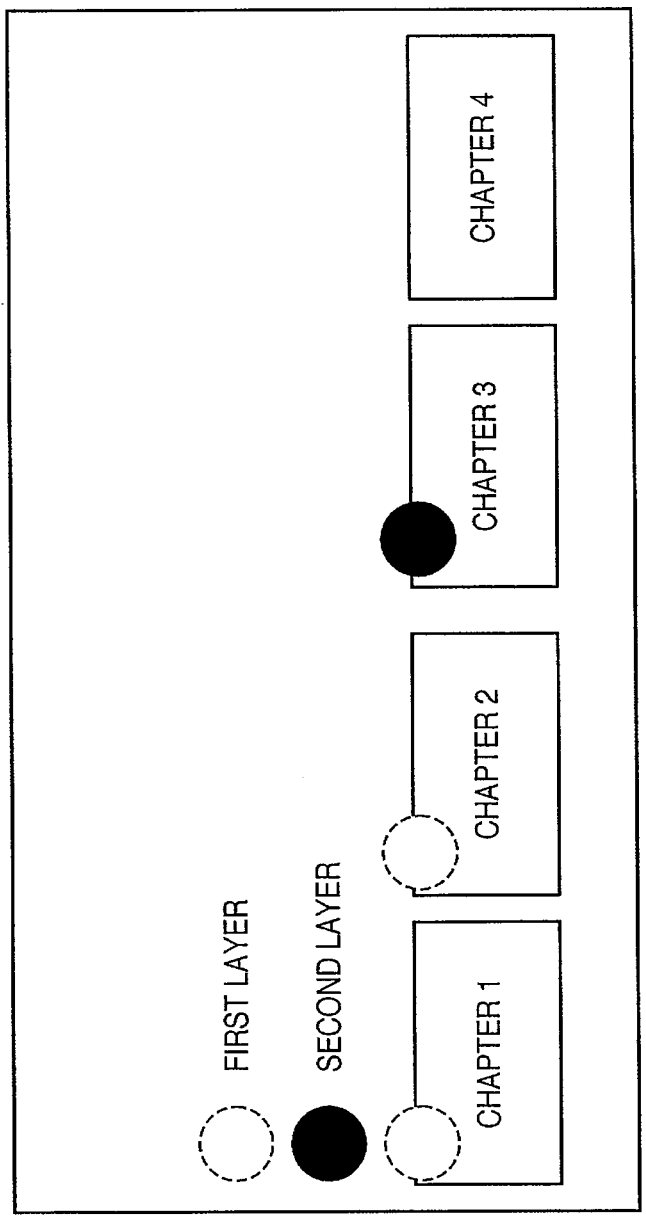
FIG. 9 shows an example of a window displayed on the display device (modified example)
Figure 10:
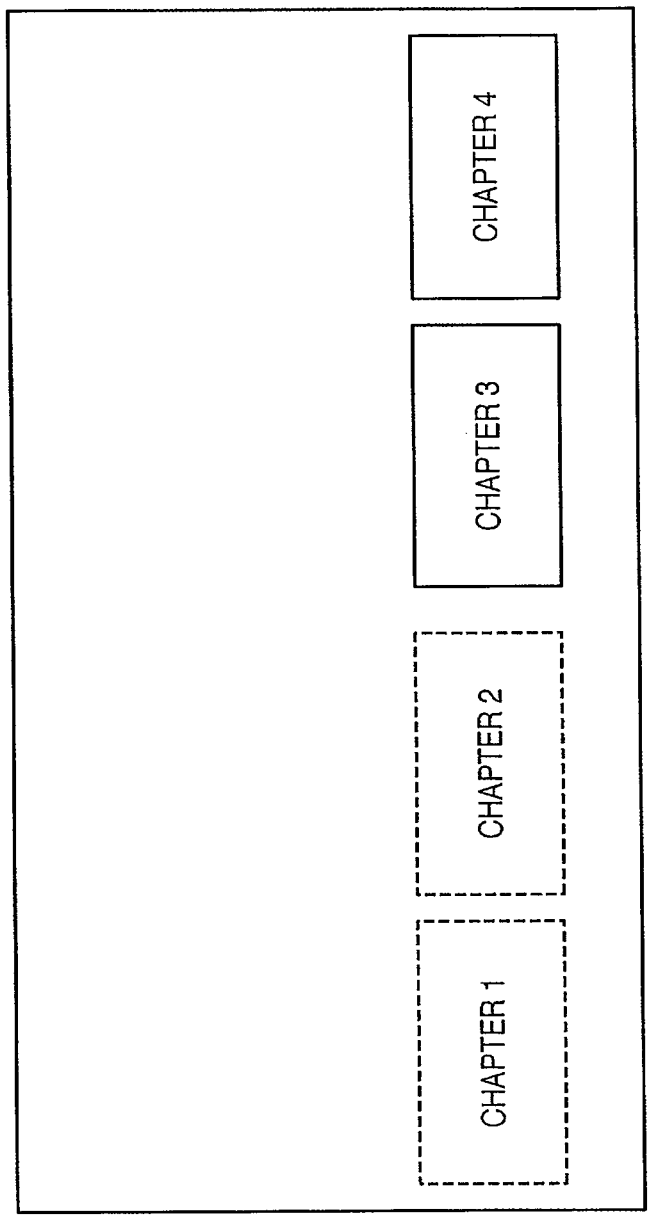
FIG. 10 shows an example of a window displayed on the display device (modified example)
Figure 11:
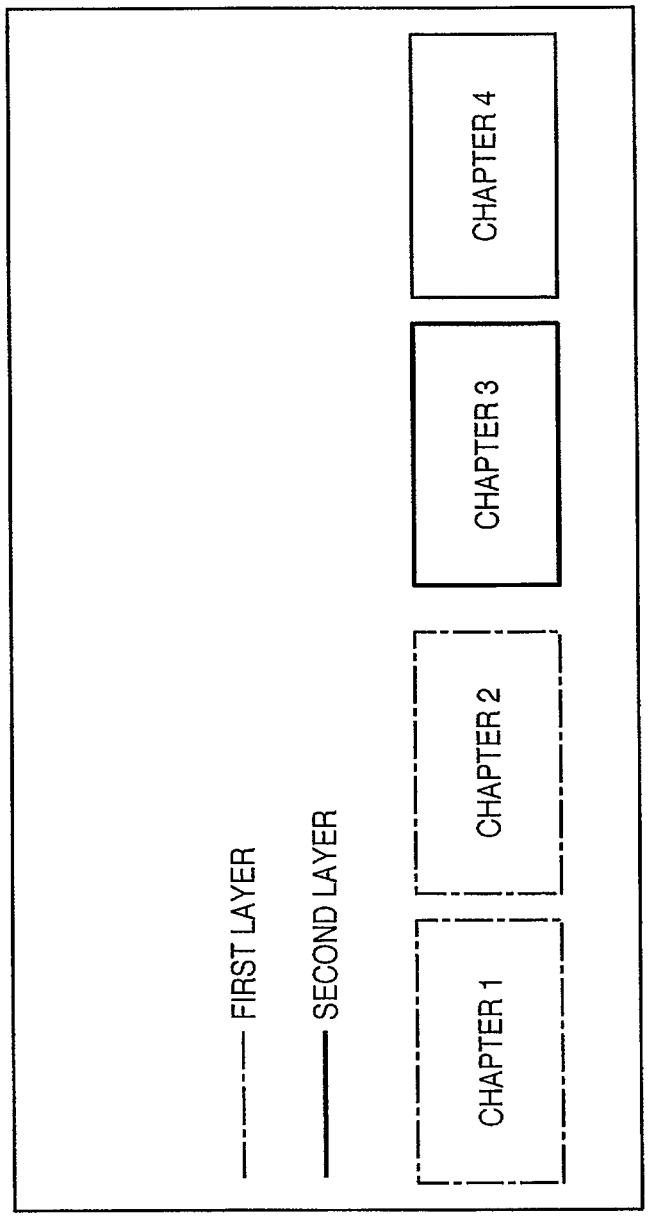
FIG. 11 shows an example of a window displayed on the display device (modified example)

Note that the range recordable on the external recording medium may be displayed by appending recordable marks to the vicinities of representative images of respective image files, as shown in FIGS. 8 and 9. Alternatively, the range recordable on the external recording medium may be displayed by changing the patterns of lines that bound representative images or their colors, as shown in FIGS. 10 and 11.

The list display window may display information unique to respective files in place of representative images.

This embodiment has explained the arrangement for transferring image files recorded on the internal HDD to the external recording medium.

In addition, the present invention can be similarly applied to an arrangement for transferring and recording image files recorded on a removable recording medium such as a large-capacity optical disk to and on another recording medium.

WORKING EXAMPLE 2

Figure 13:
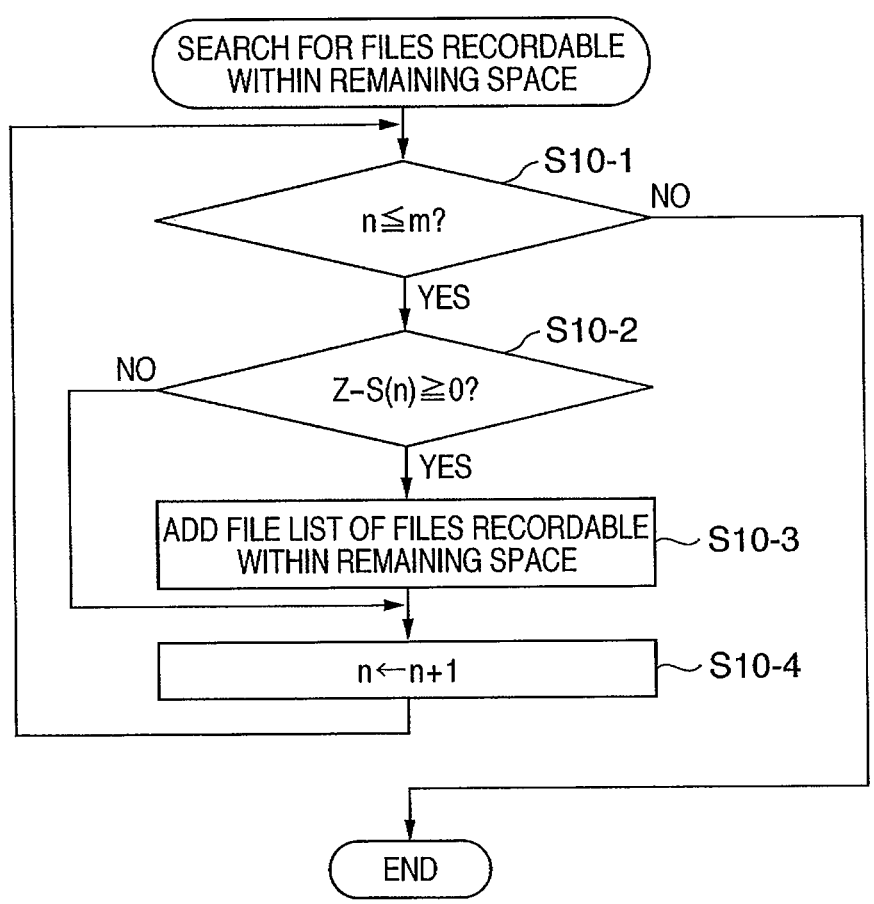
FIG. 13 is a flowchart showing the sequence of a subroutine for searching for files that can fall within the remaining space.
Figure 14:
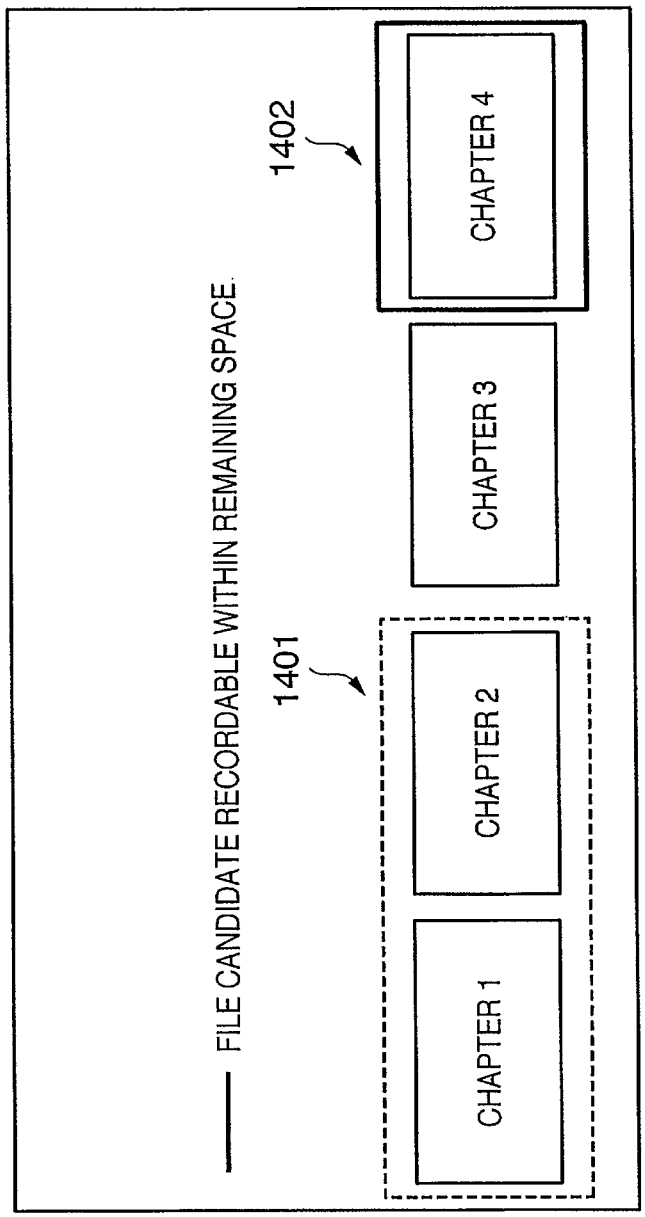
FIG. 14 shows an example of a window displayed on the display device.
Figure 15:
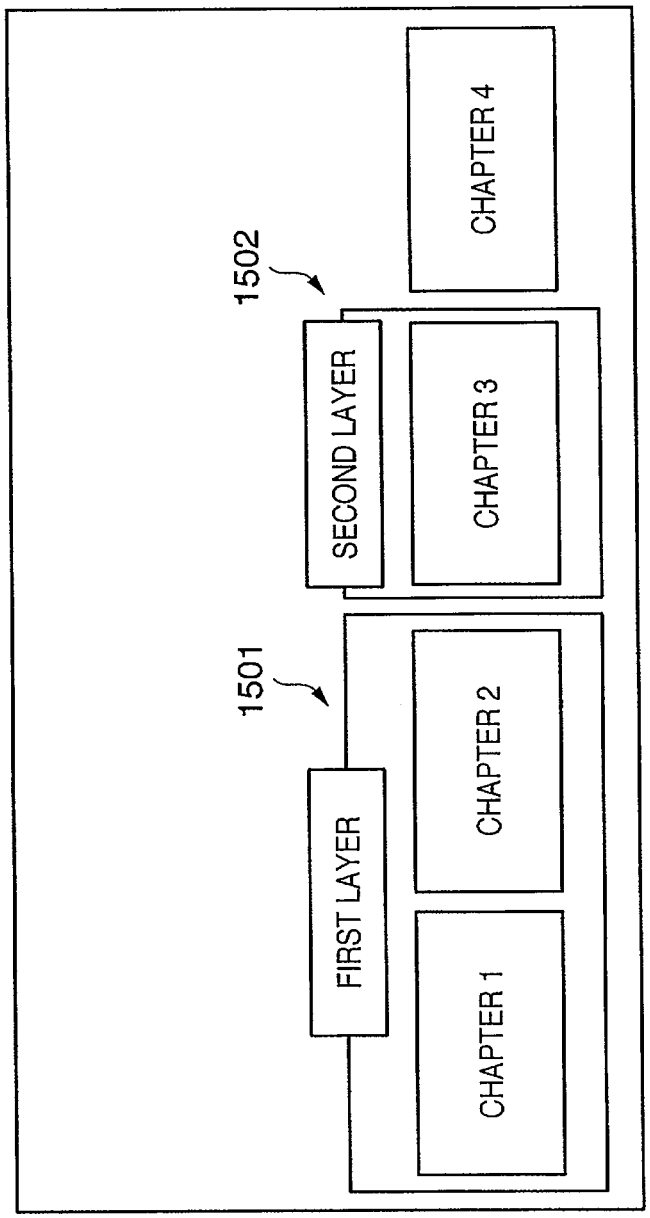
FIG. 15 shows an example of a window displayed on the display device.
Figure 16:
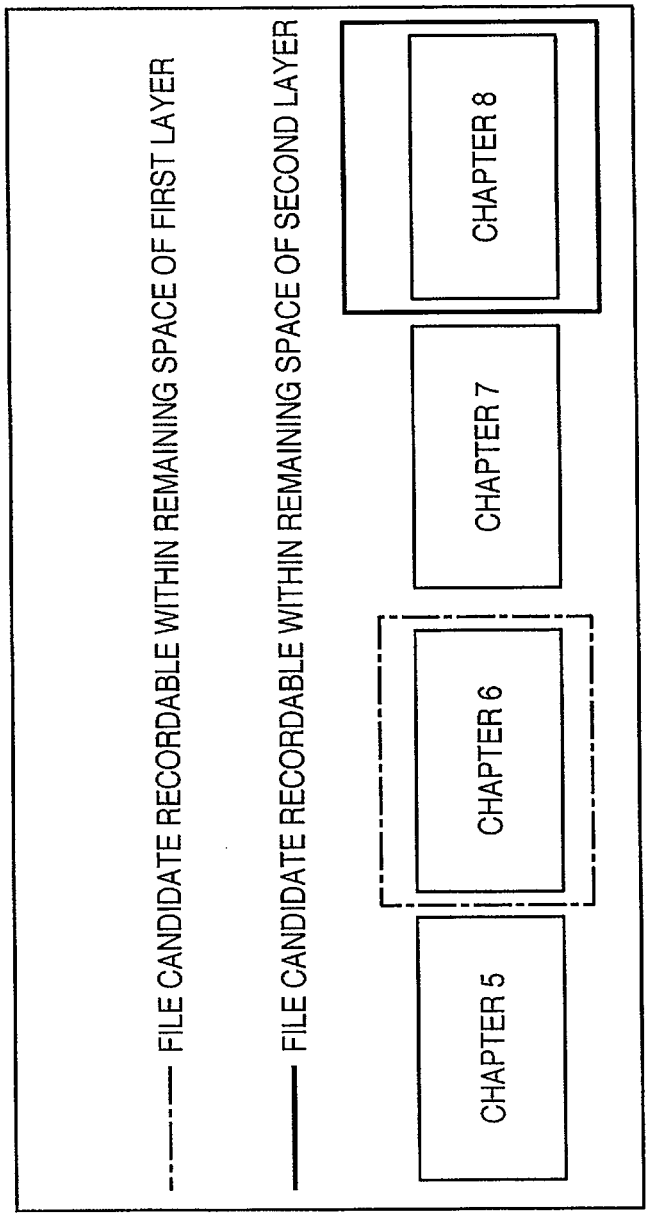
FIG. 16 shows an example of a window displayed on the display device.

As working example 2, a detailed operation example of the video camera 100 upon data transfer will be described below with reference to FIGS. 12A to 16. FIGS. 12A to 12D are flowcharts showing the sequence of processing executed when the data transfer system 1 transfers data. FIG. 13 is a flowchart showing the sequence of a subroutine for searching for files that can be stored in the remaining space. Hereinafter, the term "remaining space means the free space which would remain in the actual free space if selected files in the recordable area were recorded in actual free space. FIGS. 14 to 16 show examples of windows displayed on the display device 104.

Figure 12A:
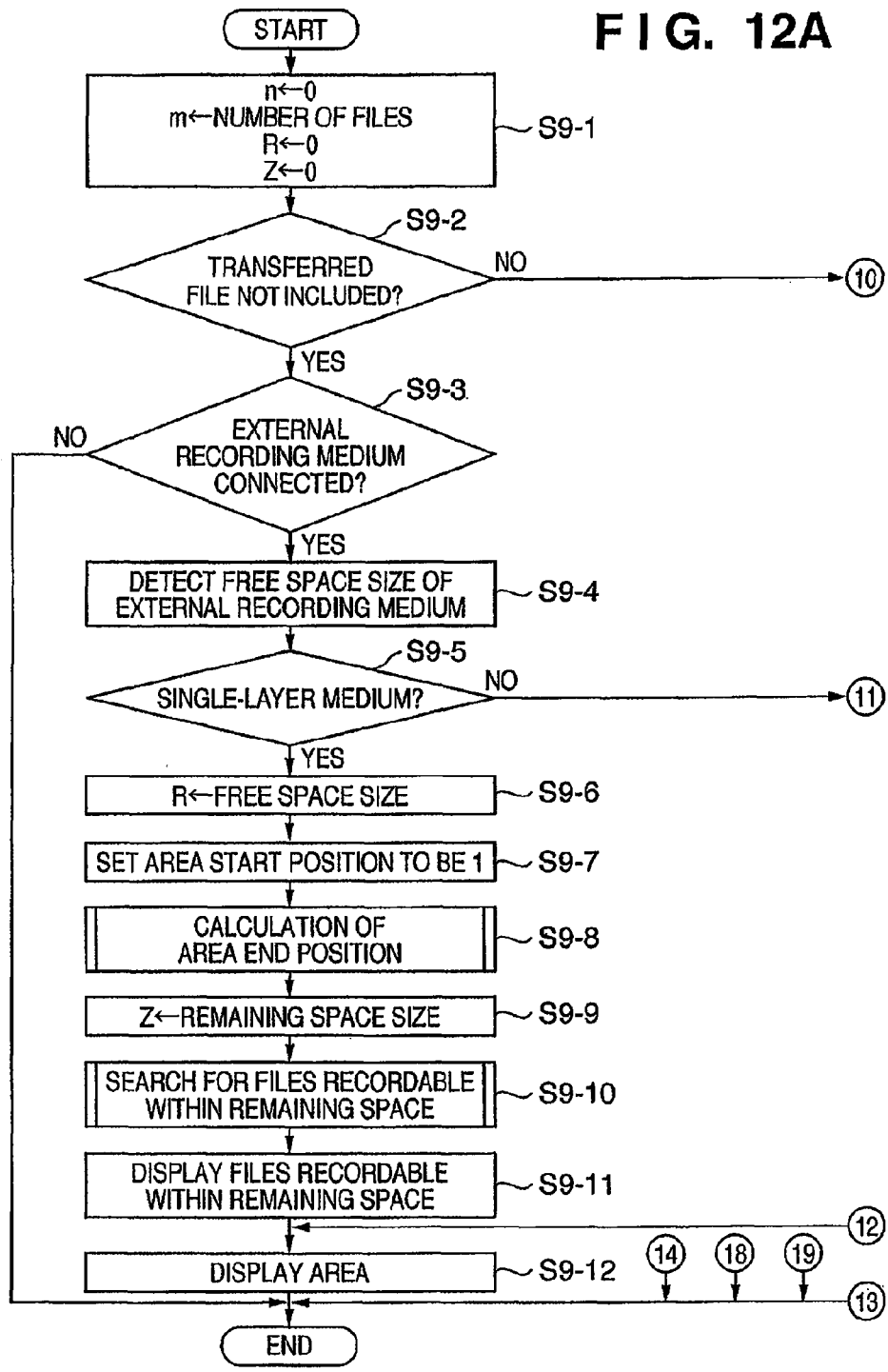
Figure 12B:
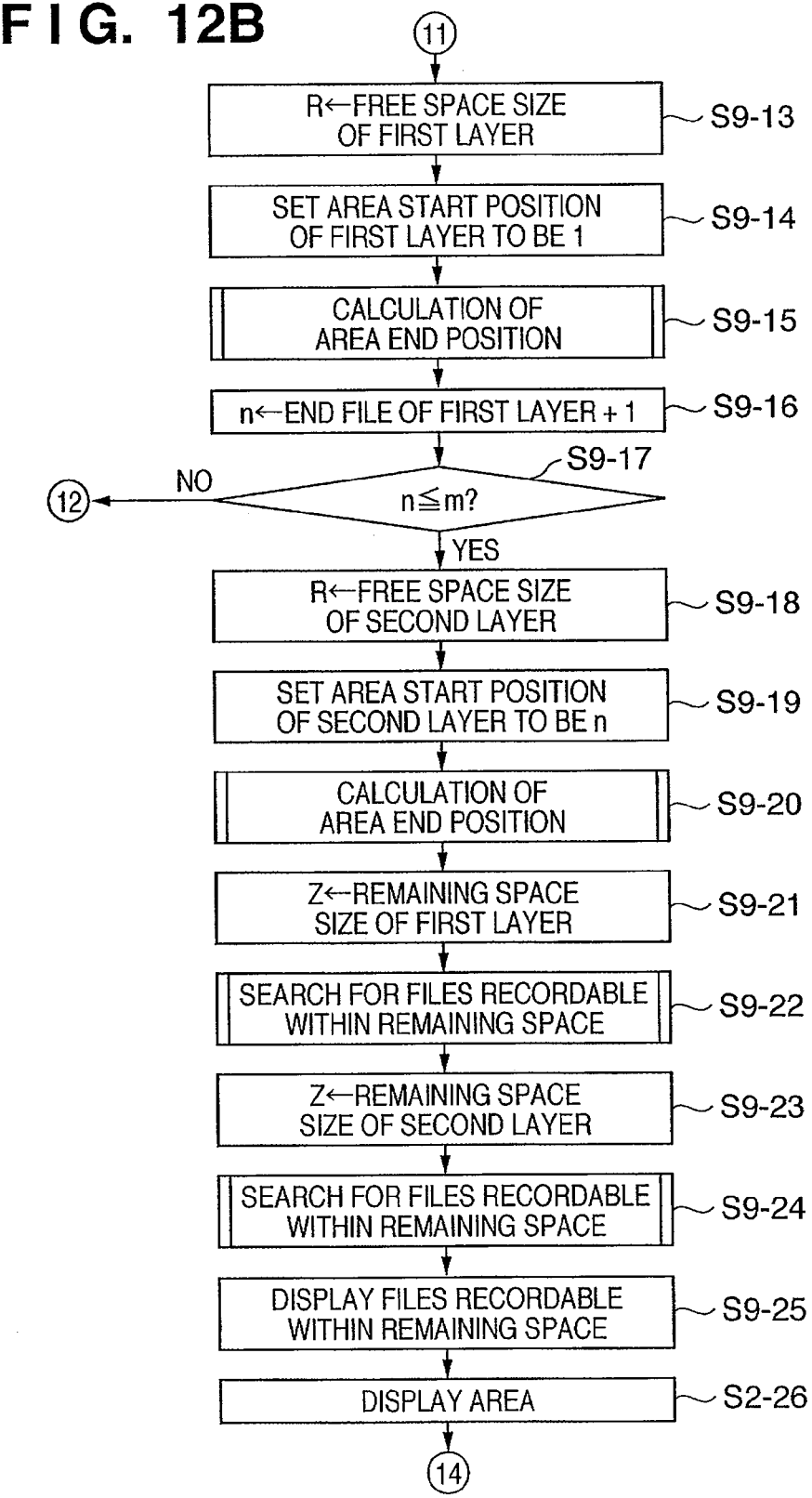
Figure 12D:
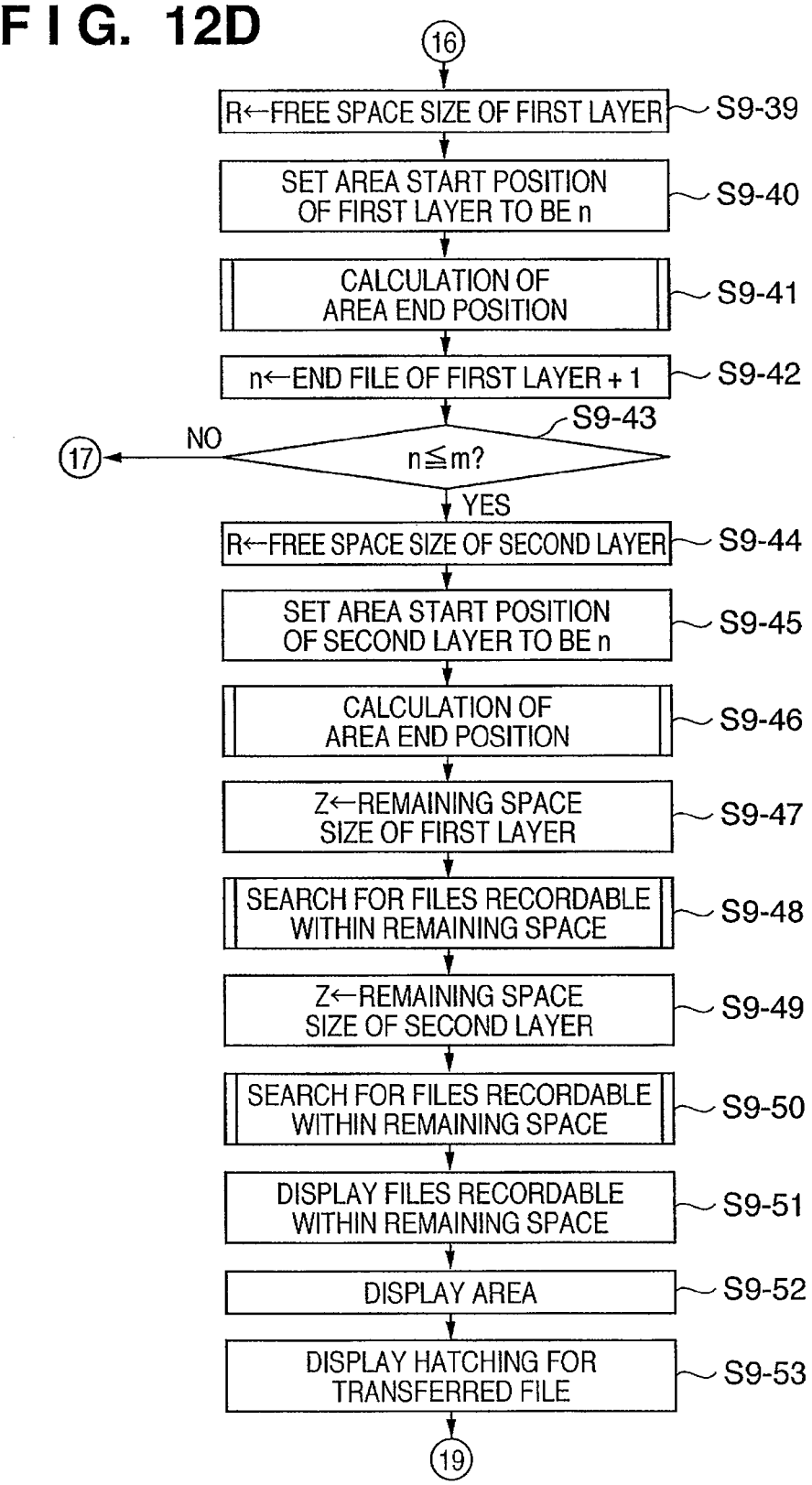

In step S9-1 shown in FIG. 12A, the control unit 107 sets the number of all files reproduced by the recording and reproducing unit 105 in a variable m, sets zero in a variable n, sets zero in a variable R, sets zero in a variable Z, thus initializing the respective variables.

The control unit 107 checks in step S9-2 if files recorded in the recording medium include a file which has already been transferred. If the control unit 107 determines that there is no file which has already been transferred, the process advances to step S9-3; otherwise, the process advances to step S9-27.

The DIF 109 checks in step S9-3 if the external recording medium is connected. If the DIF 109 receives medium information from the external recording apparatus 120 via the communication cable C0, it determines that the external recording medium is connected; otherwise, it determines that the external recording medium is not connected. If the DIF 109 decides that the external recording medium is connected, the process advances to step S9-4; otherwise, the processing ends.

In step S9-4, the DIF 109 supplies the medium information to the recording and reproducing unit 105. The recording and reproducing unit 105 detects the free space size of the detected external recording medium based on the medium information.

The recording and reproducing unit 105 checks in step S9-5 based on the medium information if the external recording medium is a single-layer recording medium. If the recording and reproducing unit 105 determines that the external recording medium is a single-layer recording medium, the process advances to step S9-6; otherwise, the process advances to step S9-13.

In step S9-6, the recording and reproducing unit 105 substitutes the free space size in the variable R.

In step S9-7, the recording and reproducing unit 105 sets the start position of a range of image files which are recordable on the external recording medium to be 1.

In step S9-8, the recording and reproducing unit 105 executes the subroutine for calculating the end position of the range of image files which are recordable on the external recording medium (see FIG. 3).

In step S9-9, the recording and reproducing unit 105 substitutes, in the variable Z, the remaining space size of the external recording medium after image files within the range recordable on the external recording medium are calculated.

In step S9-10, the recording and reproducing unit 105 executes a subroutine for searching for files which can be stored in the remaining space (see FIG. 13).

The recording and reproducing unit 105 checks in step S10-1 of the subroutine (FIG. 13) if the variable n is equal to or smaller than m, that is, if there are files to be searched. If the recording and reproducing unit 105 determines that the variable n is equal to or smaller than m, that is, that there are files to be searched, the subroutine advances to step S10-2. If the recording and reproducing unit 105 determines that the variable n is not equal to or smaller than m, that is, that there is no file to be searched, the subroutine ends.

The recording and reproducing unit 105 checks in step S10-2 of the subroutine if a result obtained by subtracting a data size S(n) of the n-th file from the remaining space size Z is equal to or larger than zero. That is, the recording and reproducing unit 105 checks if a total of data sizes (total data size) of the first to n-th files is smaller than the free space size of the external recording medium. If the recording and reproducing unit 105 determines that $Z-S(n) \geq 0$, the subroutine advances to step S10-3; otherwise, the subroutine advances to step S10-4.

In step S10-3 of the subroutine, the recording and reproducing unit 105 adds the n-th file to a list as a file which can be stored within the remaining space size.

In step S10-4 of the subroutine, the recording and reproducing unit 105 increments n, and the subroutine returns to step S10-1.

In step S9-11 shown in FIG. 12A, the recording and reproducing unit 105 supplies the information found in step S9-10 to the display control unit 103. The display control unit 103 displays, on the display device 104, files which can be stored within the remaining space size based on these pieces of information (see FIG. 14).

In step S9-12, the recording and reproducing unit 105 supplies the information set in step S9-7 and that calculated in step S9-8 to the display control unit 103. The display control unit 103 displays, on the display device 104, the range of image files which are recordable on the external recording medium based on these pieces of information (see FIG. 14).

For example, as shown in FIG. 14, the display control unit 103 displays image files recordable on the external recording medium by respectively bounding representative images "chapter 1" and "chapter 2" and a representative image "chapter 4" of representative images "chapter 1" to "chapter 4" by frames 1401 and 1402. It should be noted that the dashed frame 1401 indicates files of the recordable area, and that the solid frame 1402 indicates a recordable file in the remaining space when the files of the recordable area is recorded the medium.

Note that the display control unit 103 may display representative images in a recording order (an order in turn from older recording times) or an inverse recording order (an order in turn from newer recording times). Alternatively, the display control unit 103 may displays representative images in an order of data sizes or an order of recording time durations. When the user inputs a display order instruction of representative images, the display control unit 103 may receive that instruction via the control unit 107, and may display representative images in the display order designated by the instruction.

In step S9-13, the recording and reproducing unit 105 substitutes the free space size of the first layer in the variable R.

In step S9-14, the recording and reproducing unit 105 sets the start position of a range of image files which are recordable in the first layer of the external recording medium to be 1.

In step S9-15, the recording and reproducing unit 105 executes the subroutine for calculating the end position of the range of image files which are recordable in the first layer of the external recording medium (see FIG. 3).

In step S9-16, the recording and reproducing unit 105 substitutes "the end position of the range of image files which are recordable in the first layer"+1 in the variable n.

The recording and reproducing unit 105 checks in step S9-17 if the variable n is equal to or smaller than m, that is, if all files are stored in the first layer. If the recording and reproducing unit 105 decides that the variable n is equal to or smaller than m, that is, that all files are not stored in the first layer, the process advances to step S9-18. If the recording and reproducing unit 105 determines that the variable n is not equal to or smaller than m, that is, that all files are stored in the first layer, the process advances to step S9-12.

In step S9-18, the recording and reproducing unit 105 substitutes the free space size of the second layer in the variable R.

In step S9-19, the recording and reproducing unit 105 sets the start position of a range of image files which are recordable in the second layer of the external recording medium to be n.

In step S9-20, the recording and reproducing unit 105 executes the subroutine for calculating the end position of the range of image files which are recordable in the second layer of the external recording medium (see FIG. 3).

In step S9-21, the recording and reproducing unit 105 substitutes the remaining space size of the first layer in the variable Z.

In step S9-22, the recording and reproducing unit 105 executes the subroutine for searching for files which can be stored in the remaining space of the first layer (see FIG. 13).

In step S9-23, the recording and reproducing unit 105 substitutes the remaining space size of the second layer in the variable Z.

In step S9-24, the recording and reproducing unit 105 executes the subroutine for searching for files which can be stored in the remaining space of the second layer (see FIG. 13).

In step S9-25, the recording and reproducing unit 105 supplies pieces of information found in steps S9-22 and S9-24 to the display control unit 103. The display control unit 103 displays, on the display device 104, files which can be stored within the remaining spaces based on these pieces of information (see FIG. 16).

In step S9-26, the recording and reproducing unit 105 supplies pieces of information set in steps S9-14 and S9-19 and those calculated in steps S9-15 and S9-20 to the display control unit 103. The display control unit 103 displays, on the display device 104, image files which are recordable in the first layer of the external recording medium and those which are recordable in the second layer based on these pieces of information (see FIG. 15).

For example, as shown in FIG. 15, the display control unit 103 bounds, by a frame 1501 of the first layer, representative images "chapter 1" and "chapter 2" of representative images "chapter 1" to "chapter 4", and bounds a representative image "chapter 3" by a frame 1502 of the second layer. In this way, the display control unit 103 allows the user to easily confirm image files which are recordable in the first layer and those which are recordable in the second layer of those which are recorded in the HDD 106.

Note that the display control unit 103 may display representative images in a recording order (an order in turn from older recording times) or an inverse recording order (an order in turn from newer recording times). Alternatively, the display control unit 103 may display representative images in an order of data sizes or an order of recording time durations. When the user inputs a display order instruction of representative images, the display control unit 103 may receive that instruction via the control unit 107, and may display representative images in the display order designated by the instruction.

In step S9-27, the recording and reproducing unit 105 substitutes "the number of transferred files"+1 in the variable n.

The DIF 109 checks in step S9-28 if the external recording medium is connected. If the DIF 109 receives medium information from the external recording apparatus 120 via the communication cable C0, it determines that the external recording medium is connected; otherwise, it determines that the external recording medium is not connected. If the DIF 109 determines that the external recording medium is connected, the process advances to step S9-29; otherwise, the processing ends.

In step S9-29, the DIF 109 supplies the medium information to the recording and reproducing unit 105. The recording and reproducing unit 105 detects the free space size of the detected external recording medium based on the medium information.

The recording and reproducing unit 105 checks in step S9-30 based on the medium information if the external recording medium is a single-layer recording medium. If the recording and reproducing unit 105 determines that the external recording medium is a single-layer recording medium, the process advances to step S9-31; otherwise, the process advances to step S9-39.

In step S9-31, the recording and reproducing unit 105 substitutes the free space size in the variable R.

In step S9-32, the recording and reproducing unit 105 sets the start position of a range of recordable image files to be n.

In step S9-33, the recording and reproducing unit 105 executes the subroutine for calculating the end position of the range of recordable image files (see FIG. 3).

In step S9-34, the recording and reproducing unit 105 substitutes the remaining space size in the variable Z.

In step S9-35, the recording and reproducing unit 105 executes the subroutine for searching for files which can be stored in the remaining space (see FIG. 13).

In step S9-36, the recording and reproducing unit 105 supplies the information found in step S9-35 to the display control unit 103. The display control unit 103 displays, on the display device 104, files which can be stored within the remaining space based on these pieces of information (see FIG. 16).

In step S9-37, the recording and reproducing unit 105 supplies the information set in step S9-32 and that calculated in step S9-33 to the display control unit 103. The display control unit 103 displays, on the display device 104, the ranges of recordable image files so that the user can identify the range of image files to be recorded in the first layer and those to be recorded in the second layer (see FIG. 15).

In step S9-38, the display control unit 103 displays a hatching for transferred files on the display device 104 (see FIG. 6).

In step S9-39, the recording and reproducing unit 105 substitutes the free space size of the first layer in the variable R.

In step S9-40, the recording and reproducing unit 105 sets the start position of the range of image files which are recordable in the first layer to be n.

In step S9-41, the recording and reproducing unit 105 executes the subroutine for calculating the end position of the range of image files which are recordable in the first layer (see FIG. 3).

In step S9-42, the recording and reproducing unit 105 substitutes "the end position of the range of image files which are recordable in the first layer"+1 in the variable n.

The recording and reproducing unit 105 checks in step S9-43 if the variable n is equal to or smaller than m, that is, if all files are stored in the first layer. If the recording and reproducing unit 105 determines that the variable n is equal to or smaller than m, that is, that all files are not stored in the first layer, the process advances to step S9-44. If the recording and reproducing unit 105 determines that the variable n is not equal to or smaller than m, that is, that all files are stored in the first layer, the process advances to step S9-37.

In step S9-44, the recording and reproducing unit 105 substitutes the free space size of the second layer in the variable R.

In step S9-45, the recording and reproducing unit 105 sets the start position of the range of image files which are recordable in the second layer to be n.

In step S9-46, the recording and reproducing unit 105 executes the subroutine for calculating the end position of the range of image files which are recordable in the second layer (see FIG. 3).

In step S9-47, the recording and reproducing unit 105 substitutes the remaining space size of the first layer in the variable Z.

In step S9-48, the recording and reproducing unit 105 executes the subroutine for searching for files which can be stored in the remaining space of the first layer (see FIG. 13).

In step S9-49, the recording and reproducing unit 105 substitutes the remaining space size of the second layer in the variable Z.

In step S9-50, the recording and reproducing unit 105 executes the subroutine for searching for files which can be stored in the remaining space of the second layer (see FIG. 13).

In step S9-51, the recording and reproducing unit 105 supplies pieces of information found in steps S9-48 and S9-50 to the display control unit 103. The display control unit 103 displays, on the display device 104, files which can be stored within the remaining spaces based on these pieces of information (see FIG. 16).

In step S9-52, the recording and reproducing unit 105 supplies pieces of information set in steps S9-40 and S9-45, and those calculated in steps S9-41 and S9-46 to the display control unit 103. The display control unit 103 displays, on the display device 104, the ranges of recordable image files based on these pieces of information, so that the user can identify the range of image files to be recorded in the first layer and that of image files to be recorded in the second layer (see FIG. 15).

In step S9-53, the display control unit 103 displays a hatching for a transferred file on the display device 104 (see FIG. 7).

As described above, this working example has exemplified the case wherein file candidates which can be stored within the remaining space of the external recording medium are bounded by a frame when they are displayed (see FIGS. 14 to 16). That is, since the remaining space size of the connected external recording medium is acquired and file candidates which can be stored within the remaining space are displayed before the beginning of transfer, the user can confirm up to which file he or she can transfer.

Note that the range of recordable image files may be displayed using "recordable" marks, as shown in FIGS. 8 and 9. Alternatively, the range of recordable image files may be displayed by changing the patterns of lines that bound representative images or their colors, as shown in FIGS. 10 and 11.

The list display window may display titles or information unique to a file (e.g., a file ID) in place of representative images. As a result, the operational load when transferring data to the external recording medium can be reduced.

WORKING EXAMPLE 3

Figure 20:
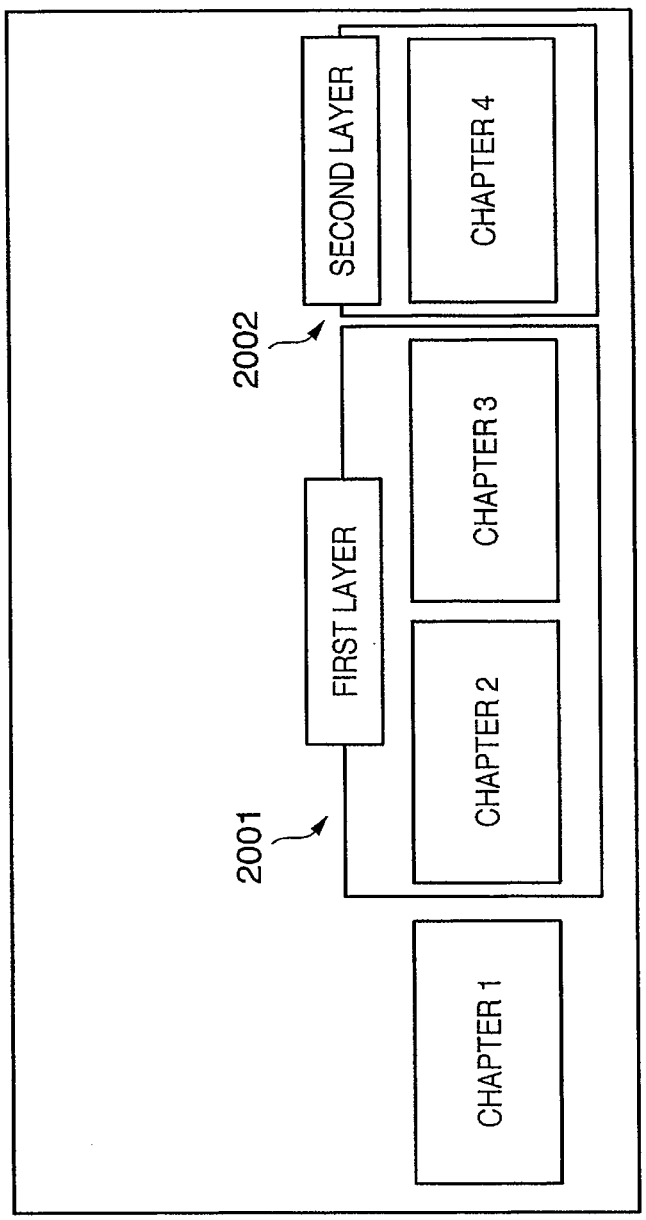
FIG. 20 shows an example of a window displayed on the display device.

As working example 3, a detailed operation example of the video camera 100 upon data transfer will be described below with reference to FIGS. 17A to 20. FIGS. 17A to 17D are flowcharts showing the sequence of processing executed when the data transfer system 1 transfers data. FIG. 18 shows an example of a panel of the video camera. A cross key 15-1 (operation unit 108) accepts a change instruction of a range of recordable image files. FIGS. 19 and 20 show examples of windows displayed on the display device 104.

Figure 17A:
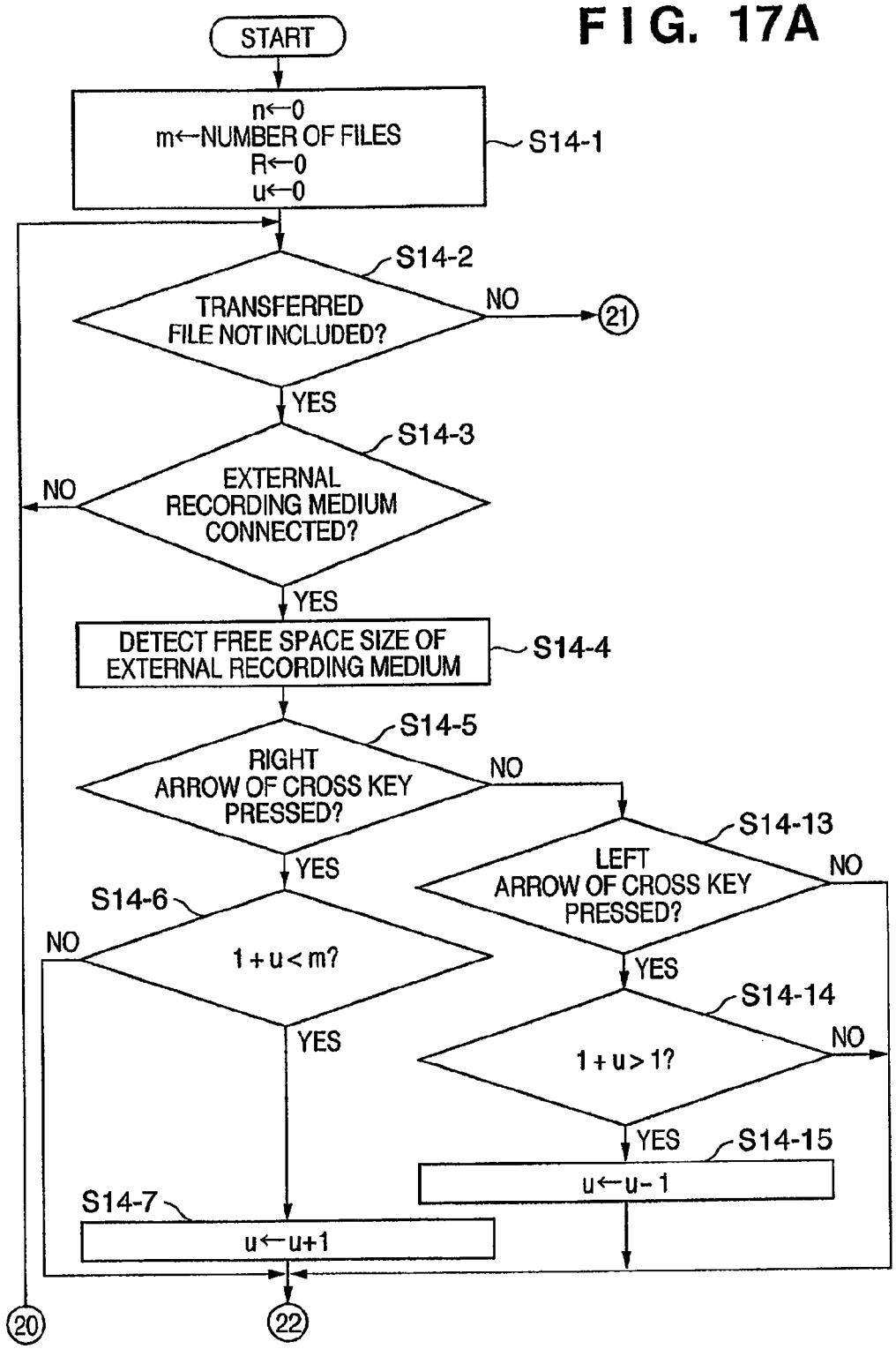
Figure 17B:
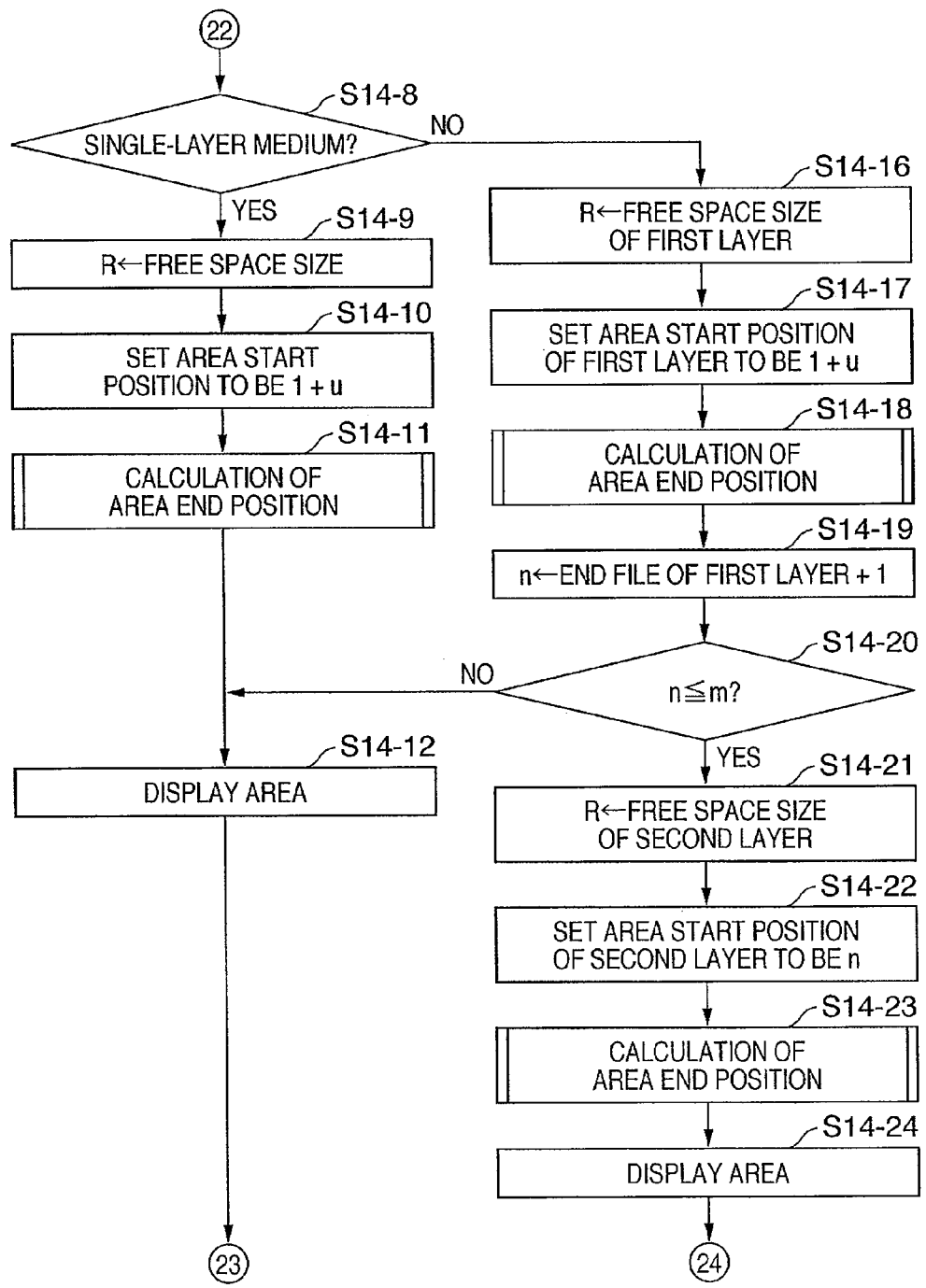
Figure 17C:
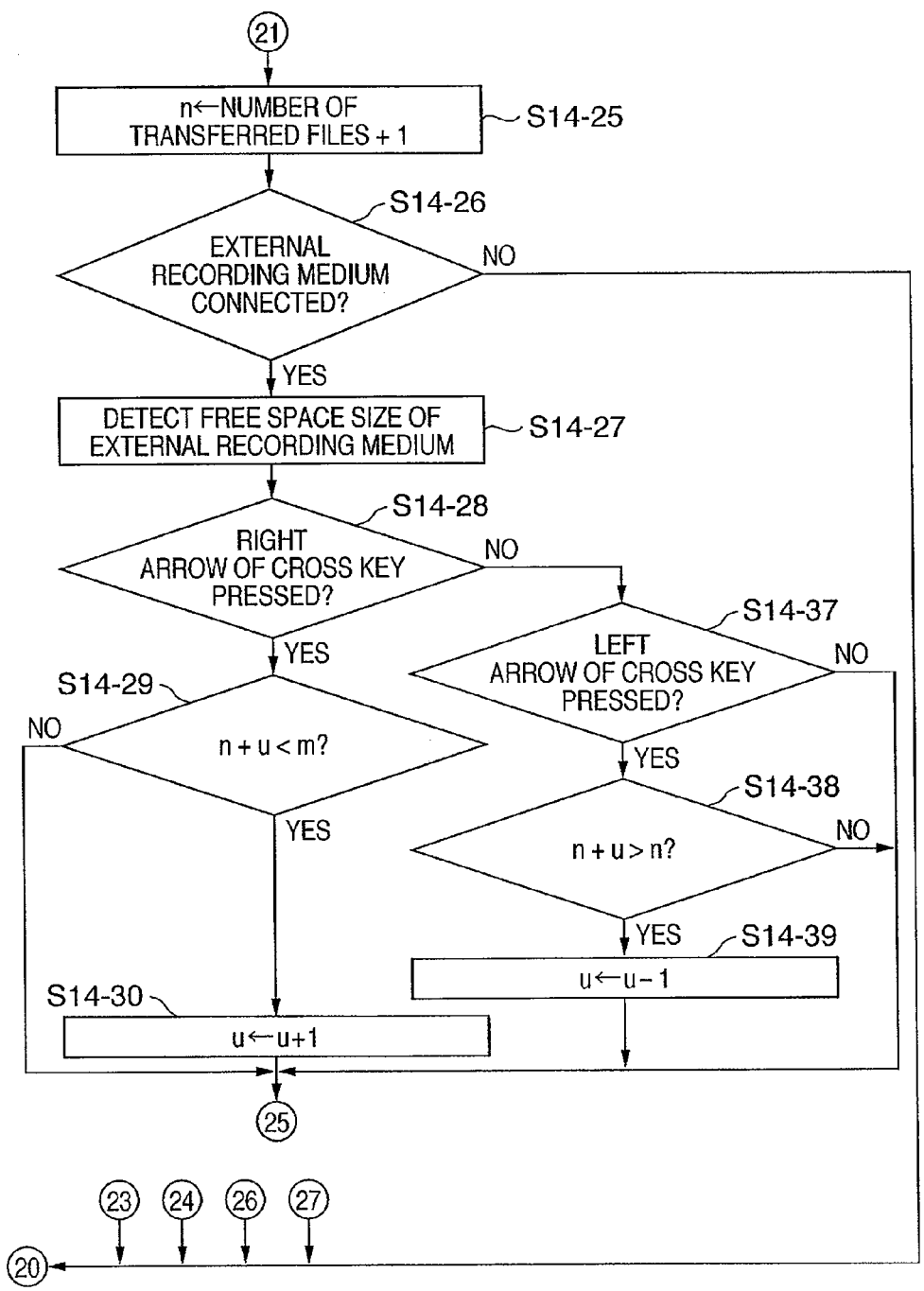

In step S14-1 shown in FIG. 17A, the control unit 107 sets the number of all files recorded on the HDD 106 in a variable m, sets zero in a variable n, sets zero in a variable R, sets zero in a variable u, thus initializing the respective variables.

The control unit 107 checks in step S14-2 if files recorded on the recording medium include a file which has already been transferred. If the control unit 107 determines that there is no file which has already been transferred, the process advances to step S14-3; otherwise, the process advances to step S14-25.

The DIF 109 checks in step S14-3 if the external recording medium is connected. If the DIF 109 receives medium information from the external recording apparatus 120 via the communication cable C0, it determines that the external recording medium is connected; otherwise, it determines that the external recording medium is not connected. If the DIF 109 determines that the external recording medium is connected, the process advances to step S14-4; otherwise, the process returns to step S14-2.

In step S14-4, the DIF 109 supplies the medium information to the recording and reproducing unit 105. The recording and reproducing unit 105 determines the free space size of the detected external recording medium based on the medium information.

The control unit 107 checks in step S14-5 if the user has pressed a right arrow part of the cross key 15-1 (operation unit 108). If the control unit 107 determines that the user has pressed the right arrow part, the process advances to step S14-6; otherwise, the process advances to step S14-13.

The recording and reproducing unit 105 checks in step S14-6 if "1+variable u" is smaller than m. That is, upon detection of a range of image files which are recordable on the external recording medium, the recording and reproducing unit 105 checks if the leading file of that range is the last file recorded on the HDD 106. If the recording and reproducing unit 105 determines that "1+variable u" is smaller than m, the process advances to step S14-7.

That is, in this case, if the leading file upon detection of the range of image files which are recordable on the external recording medium is not the last file in the HDD 106, the process advances to step S14-7.

On the other hand, if the recording and reproducing unit 105 determines that "1+variable u" is not smaller than m, that is, that the leading file upon detection of the range of image files which are recordable on the external recording medium is the last file in the HDD 106, the process advances to step S14-8.

In step S14-7, the recording and reproducing unit 105 increments the variable u.

The control unit 107 checks in step S14-13 if the user has pressed a left arrow part of the cross key 15-1 (operation unit 108). If the control unit 107 determines that the user has pressed the left arrow part, the process advances to step S14-14; otherwise, the process advances to step S14-8.

The recording and reproducing unit 105 checks in step S14-14 if "1+variable u" is larger than 1. That is, upon detection of the range of image files which are recordable on the external recording medium, the recording and reproducing unit 105 checks if the leading file of that range is the first file in the HDD 106. If the recording and reproducing unit 105 determines that "1+variable u" is larger than 1, the process advances to step S14-15.

That is, in this case, if the leading file of the range of image files which are recordable on external recording medium is not the first file in the HDD 106, the process advances to step S14-15.

On the other hand, if the recording and reproducing unit 105 determines that "1+variable u" is not larger than 1, that is, that the first file upon detection of the range of image files which are recordable on external recording medium is the first file in the HDD 106, the process advances to step S14-8.

In step S14-15, the recording and reproducing unit 105 decrements the variable u.

The recording and reproducing unit 105 checks in step S14-8 based on the medium information if the external recording medium is a single-layer recording medium. If the recording and reproducing unit 105 determines that the external recording medium is a single-layer recording medium, the process advances to step S14-9; otherwise, the process advances to step S14-16.

In step S14-9, the recording and reproducing unit 105 substitutes the free space size in the variable R.

In step S14-10, the recording and reproducing unit 105 sets the start position of the range of image files which are recordable on the external recording medium to be "1+variable u".

In step S14-11, the recording and reproducing unit 105 executes the subroutine for calculating the end position of the range of image files which are recordable on the external recording medium (see FIG. 3).

In step S14-12, the recording and reproducing unit 105 supplies the information set in step S14-10 and that calculated in step S14-11 to the display control unit 103. The display control unit 103 displays, on the display device 104, the range of image files which are recordable on the external recording medium of those in the HDD 106 based on these pieces of information (see FIG. 19).

For example, as shown in FIG. 19, the display control unit 103 displays the range of image files which are recordable on the external recording medium by bounding representative images "chapter 2" and "chapter 3" of representative images "chapter 1" to "chapter 4" by a frame 1901.

Note that the display control unit 103 may display representative images in a recording order (an order in turn from older recording times) or an inverse recording order (an order in turn from newer recording times). Alternatively, the display control unit 103 may display representative images in an order of data sizes or an order of recording time durations. When the user inputs a display order instruction of representative images, the display control unit 103 may receive that instruction via the control unit 107, and may display representative images in a display order based on the instruction.

The display control unit 103 then returns the process to step S14-2.

In step S14-16, the recording and reproducing unit 105 substitutes the free space size of the first layer in the variable R.

In step S14-17, the recording and reproducing unit 105 sets the start position of a range of image files which are recordable in the first layer to be "1+variable u".

In step S14-18, the recording and reproducing unit 105 executes the subroutine for calculating the end position of the range of image files which are recordable in the first layer (see FIG. 3).

In step S14-19, the recording and reproducing unit 105 substitutes "the end position of the range of image files which are recordable in the first layer"+1 in the variable n.

The recording and reproducing unit 105 check in step S14-20 if the variable n is equal to or smaller than m, that is, if all files are stored in the first layer. If the recording and reproducing unit 105 determines that the variable n is equal to or smaller than m, that is, that all files are not stored in the first layer, the process advances to step S14-21. If the recording and reproducing unit 105 determines that the variable n is not equal to or smaller than m, that is, that all files are stored in the first layer, the process advances to step S14-12.

In step S14-21, the recording and reproducing unit 105 substitutes the free space size of the second layer in the variable R.

In step S14-22, the recording and reproducing unit 105 sets the start position of a range of image files which are recordable in the second layer to be n.

In step S14-23, the recording and reproducing unit 105 executes the subroutine for calculating the end position of the range of image files which are recordable in the second layer (see FIG. 3).

In step S14-24, the recording and reproducing unit 105 supplies pieces of information set in steps S14-17 and S14-22 and those calculated in steps S14-18 and S14-23 to the display control unit 103. The display control unit 103 displays, on the display device 104, the ranges of recordable image files based on these pieces of information, so that the user can identify the range of image files to be recorded in the first layer and that of image files to be recorded in the second layer (see FIG. 20).

For example, as shown in FIG. 20, the display control unit 103 bounds, by a frame 2001 of the first layer, representative images "chapter 2" and "chapter 3" of representative images "chapter 1" to "chapter 4", and bounds a representative image "chapter 4" by a frame 2002 of the second layer. In this way, the display control unit 103 displays, on the display device 104, the ranges of recordable image files, so that the user can identify the range of image files to be recorded in the first layer and that of image files to be recorded in the second layer.

Note that the display control unit 103 may display representative images in a recording order (an order in turn from older recording times) or an inverse recording order (an order in turn from newer recording times). Alternatively, the display control unit 103 may displays representative images in an order of data sizes or an order of recording time durations. When the user inputs a display order instruction of representative images to the operation unit 108, the display control unit 103 may receive that instruction via the control unit 107, and may display representative images in the display order designated by the instruction.

Then, the recording and reproducing unit 105 returns the process to step S14-2.

In step S14-25, the recording and reproducing unit 105 substitutes "the number of transferred files"+1 in the variable n.

The DIF 109 checks in step S14-26 if the external recording medium is connected. If the DIF 109 receives medium information from the external recording apparatus 120 via the communication cable C0, it determines that the external recording medium is connected; otherwise, it determines that the external recording medium is not connected. If the DIF 109 determines that the external recording medium is connected, the process advances to step S14-27; otherwise, the process returns to step S14-2.

In step S14-27, the DIF 109 supplies the medium information to the recording and reproducing unit 105. The recording and reproducing unit 105 detects the free space size of the detected external recording medium based on the medium information.

The control unit 107 checks in step S14-28 if the user has pressed the right arrow part of the cross key 15-1 (operation unit 108). If the control unit 107 determines that the user has pressed the right arrow part, the process advances to step S14-29; otherwise, the process advances to step S14-37.

The recording and reproducing unit 105 checks in step S14-29 if "variable n+variable u" is smaller than m, that is, if the leading file of the range of recordable image files is the last file. If the recording and reproducing unit 105 determines that "variable n+variable u" is smaller than m, that is, that the leading file of the range of recordable image files is not the last file, the process advances to step S14-30. If the recording and reproducing unit 105 determines that "variable n+variable u" is not smaller than m, that is, that the leading file of the range of recordable image files is the last file, the process advances to step S14-31.

In step S14-30, the recording and reproducing unit 105 increments the variable u.

The control unit 107 checks in step S14-37 if the user has pressed the left arrow part of the cross key 15-1 (operation unit 108). If the control unit 107 determines that the user has pressed the left arrow part, the process advances to step S14-38; otherwise, the process advances to step S14-31.

The recording and reproducing unit 105 checks in step S14-38 if "variable n+variable u" is larger than n, that is, if the leading file of the range of recordable image files is the first one of non-transferred files. If the recording and reproducing unit 105 determines that "variable n+variable u" is larger than n, that is, that the leading file of the range of recordable image files is not the first one of non-transferred files, the process advances to step S14-39. If the recording and reproducing unit 105 determines that "variable n+variable u" is not larger than n, that is, that the first file of the range of recordable image files is the first one of non-transferred files, the process advances to step S14-31.

In step S14-39, the recording and reproducing unit 105 decrements the variable u.

The recording and reproducing unit 105 checks in step S14-31 based on the medium information if the external recording medium is a single-layer recording medium. If the recording and reproducing unit 105 determines that the external recording medium is a single-layer recording medium, the process advances to step S14-32; otherwise, the process advances to step S14-40.

In step S14-32, the recording and reproducing unit 105 substitutes the free space size in the variable R.

In step S14-33, the recording and reproducing unit 105 sets the start position of the range of recordable image files to be n+u.

In step S14-34, the recording and reproducing unit 105 executes the subroutine for calculating the end position of the range of recordable image files (see FIG. 3).

In step S14-35, the recording and reproducing unit 105 supplies the information set in step S14-33 and that calculated in step S14-34 to the display control unit 103. The display control unit 103 displays, on the display device 104, the range of recordable image files from the leading one of non-transferred files based on these pieces of information (see FIG. 19).

In step S14-36, the display control unit 103 displays a hatching for transferred files on the display device 104 (see FIG. 6). The recording and reproducing unit 105 returns the process to step S14-2.

In step S14-40, the recording and reproducing unit 105 substitutes the free space size of the first layer in the variable R.

In step S14-41, the recording and reproducing unit 105 sets the start position of the range of image files which are recordable in the first layer to be n+u.

In step S14-42, the recording and reproducing unit 105 executes the subroutine for calculating the end position of the range of image files which are recordable in the first layer (see FIG. 3).

In step S14-43, the recording and reproducing unit 105 substitutes "the end position of the range of image files which are recordable in the first layer"+1 in the variable n.

The recording and reproducing unit 105 checks in step S14-44 if the variable n is equal to or smaller than m, that is, if all files are stored in the first layer. If the recording and reproducing unit 105 determines that the variable n is equal to or smaller than m, that is, that all files are not stored in the first layer, the process advances to step S14-45. If the recording and reproducing unit 105 determines that the variable n is not equal to or smaller than m, that is, that all files are stored in the first layer, the process advances to step S14-35.

In step S14-45, the recording and reproducing unit 105 substitutes the free space size of the second layer in the variable R.

In step S14-46, the recording and reproducing unit 105 sets the start position of a range of image files which are recordable in the second layer to be n.

In step S14-47, the recording and reproducing unit 105 executes the subroutine for calculating the end position of the range of image files which are recordable in the second layer (see FIG. 3).

In step S14-48, the recording and reproducing unit 105 supplies pieces of information set in steps S14-41 and S14-46, and those calculated in steps S14-42 and S14-47 to the display control unit 103. The display control unit 103 displays, on the display device 104, the ranges of recordable image files based on these pieces of information, so that the user can identify the range of image files to be recorded in the first layer and that of image files to be recorded in the second layer (see FIG. 20).

In step S14-49, the display control unit 103 displays a hatching for a transferred file on the display device 104 (see FIG. 7). Then, the recording and reproducing unit 105 returns the process to step S14-2.

As described above, this working example has exemplified the case wherein the range of image files recordable on the external recording medium is changed and displayed using the cross key (see FIGS. 18 to 20). That is, since the recording capacity of the connected external recording medium is acquired before the beginning of transfer to change the recordable area, and the range of recordable image files is changed and identifiably displayed, the user can easily confirm up to which file he or she can transfer while reflecting the user's request. In this manner, the operational load when transferring data to the external recording medium can be reduced.

Note that the range of recordable image files may be displayed using "recordable" marks, as shown in FIGS. 8 and 9. Alternatively, the range of recordable image files may be displayed by changing the patterns of lines that bound representative images or their colors, as shown in FIGS. 10 and 11.

The list display window may display titles or information unique to a file (e.g., a file ID) in place of representative images.

Note that the present invention may be applied to either a system constituted by a plurality of devices (e.g., a host computer, interface device, reader, printer, and the like), or an apparatus consisting of a single device (e.g., a copying machine, facsimile apparatus, or the like).

A storage medium, which records a program code of software that can implement the functions of the aforementioned embodiments, is supplied to the system or apparatus. Then, a computer (or a CPU or MPU) of the system or apparatus reads out and executes the program code stored in the storage medium, thereby achieving the objects of the present invention.

In this case, the program code itself read out from the storage medium implements the functions of the above-mentioned embodiments, and the storage medium which stores the program code constitutes the present invention.

As the storage medium used to supply the program code, for example, a floppy (Japanese registered trademark) disk, hard disk, optical disk, magneto-optical disk, CD-ROM, CD-R, magnetic tape, nonvolatile memory card, ROM, and the like can be used.

The functions of the aforementioned embodiments can be implemented when the computer executes the readout program code. The functions of the aforementioned embodiments can also be implemented by some or all of actual processing operations executed by an OS (operating system) or the like, which runs on the computer, based on instructions of the program code.

Furthermore, the program code read out from the storage medium is written in a memory equipped on a function expansion board or function expansion unit, which is inserted into or connected to the computer. After that, a CPU or the like equipped on the function expansion board or unit executes some or all of actual processing operations based on instructions of the program code to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-333870, filed on Dec. 11, 2006 which is hereby incorporated by reference herein in its entirety.

What is claimed is:

1. A data transfer apparatus comprising:
  a recording unit adapted to record image data on a first recording medium;
  a communication unit adapted to communicate with a recording apparatus which records image data on a second recording medium, the communication unit transferring image data recorded on the first recording medium to the recording apparatus and receiving medium information associated with a free space size of the second recording medium from the recording apparatus;

a detection unit adapted to detect the free space size of the second recording medium based on the medium information received by the communication unit;

a selection unit adapted to automatically select image data from a plurality of image data recorded on the first recording medium such that a total data size of the selected image data does not exceed the free space size of the second recording medium, based on the free space size of the second recording medium detected by the detection unit and a size of each of the plurality of image data recorded on the first recording medium;

an output unit adapted to output representative images of the plurality of image data recorded on the first recording medium to a display device, wherein the output unit outputs discrimination information for discriminating the image data selected by the selection unit to the display device such that the discrimination information is displayed together with the representative images of the image data selected by the selection unit;

a designation unit adapted to designate, from the representative images of the plurality of image data displayed on the display device together with the discrimination information, the representative image of the image data to be recorded on the second recording medium in accordance with an instruction for designating the representative image by a user; and a control unit adapted to control the communication unit to transfer the image data corresponding to the representative image designated by the designation unit from the first recording medium to the recording apparatus.

2. The apparatus according to claim 1, wherein the selection unit automatically selects a plurality of image data including head image data of the plurality of image data recorded on the first recording medium.

3. The apparatus according to claim 1, the output unit outputs the representative images of the plurality of image data such that the representative images are displayed according to a predetermined display order, and wherein the selection unit automatically selects the image data recordable on the second recording medium according to the predetermined display order.

4. The apparatus according to claim 1, wherein the output unit outputs, to the display device, information indicating the representative image of the image data which has already been transferred to the recording apparatus among the plurality of representative images displayed on the display device.

5. The apparatus according to claim 1, wherein
the second recording medium is a recording medium including a plurality of recording layers,
the selection unit automatically selects the plurality of image data recordable in each of the plurality of recording layers such that a total data size of the selected image data does not exceed the free space size of each of the plurality of recording layers, and
the output unit outputs the discrimination information for discriminating the image data recordable in each of the plurality of recording layers to the display device.

6. An imaging apparatus comprising:
an imaging unit adapted to generate image data by capturing an image including an object;
a recording unit adapted to record image data generated by the imaging unit on a first recording medium;

a communication unit adapted to communicate with a recording apparatus which records image data on a second recording medium, the communication unit transferring image data recorded on the first recording medium to the recording apparatus and receiving medium information associated with a free space size of the second recording medium from the recording apparatus;

a detection unit adapted to detect the free space size of the second recording medium based on the medium information received by the communication unit;

a selection unit adapted to automatically select image data from a plurality of image data recorded on the first recording medium such that a total data size of the selected image data does not exceed the free space size of the second recording medium, based on the free space size of the second recording medium detected by the detection unit and a size of each of the plurality of image data recorded on the first recording medium;

an output unit adapted to output representative images of a plurality of image data recorded on the first recording medium to a display device, wherein the output unit outputs discrimination information for discriminating the image data selected by the selection unit to the display device such that the discrimination information is displayed together with the representative images of the image data selected by the selection unit;

a designation unit adapted to designate, from the representative images of the plurality of image data displayed on the display device together with the discrimination information, the representative image of the image data to be recorded on the second recording medium in accordance with an instruction for designating the representative image by a user; and a control unit adapted to control the communication unit to transfer the image data corresponding to the representative image designated by the designation unit from the first recording medium to the recording apparatus.

7. A data transfer system in which a data transfer apparatus and a recording apparatus are connected to each other to be able to communicate with each other,
wherein the data transfer apparatus is a data transfer apparatus according to claim 1.

8. A communication apparatus comprising:
a reading unit adapted to read image data from a first recording medium;
a communication unit adapted to communicate with a recording apparatus which records image data on a second recording medium, the communication unit transferring image data read from the first recording medium by the reading unit to the recording apparatus and receiving medium information associated with a free space size of the second recording medium from the recording apparatus;
a detection unit adapted to detect the free space size of the second recording medium based on the medium information received by the communication unit;
a selection unit adapted to automatically select image data from a plurality of image data recorded on the first recording medium such that a total data size of the selected image data does not exceed the free space size of the second recording medium, based on the free space size of the second recording medium detected by the detection unit and a size of each of the plurality of image data recorded on the first recording medium;

an output unit adapted to output representative images of the plurality of image data recorded on the first recording medium to a display device, wherein the output unit outputs discrimination information for discriminating the image data selected by the selection unit to the display device such that the discrimination information is displayed together with the representative images of the image data selected by the selection unit;

a designation unit adapted to designate, from the representative images of the plurality of image data displayed on the display device together with the discrimination information, the representative image of the image data to be recorded on the second recording medium in accordance with an instruction for designating the representative image by a user; and a control unit adapted to control the reading unit to read the image data corresponding to the representative image data designated by the designation unit and control the communication unit to transfer the image data read by the reading unit to the recording apparatus such that the designated image data is recorded on the second recording medium.

9. The apparatus according to claim 8, wherein the output unit outputs information indicating a range from head image data to last image data of the plurality of image data selected by the selection unit to the display device.

10. The apparatus according to claim 8, wherein the selection unit automatically selects the image data recordable on the second recording medium according to a recording order of the plurality of image data recorded on the first recording medium.

11. The apparatus according to claim 8, wherein the selection unit selects the image data other than the image data which has already been transferred to the recording apparatus from the plurality of image data recorded on the first recording medium.

12. A communication apparatus comprising:
a reading unit adapted to read image data from a first recording medium;
a communication unit adapted to communicate with a recording apparatus which records image data on a second recording medium, the communication unit transferring image data read from the first recording medium by the reading unit to the recording apparatus and receiving medium information associated with a free space size of the second recording medium from the recording apparatus;
a detection unit adapted to detect the free space size of the second recording medium based on the medium information received by the communication unit;
a determining unit adapted to automatically determine first image data and second image data from a plurality of image data recorded on the first recording medium based on the free space size of the second recording medium detected by the detection unit and a size of each of the plurality of image data recorded on the first recording medium;
wherein the determining unit determines the first image data and the second image data such that a total size of the image data from the first image data to the second image data does not exceed the free space size of the second recording medium;
an output unit adapted to output representative images of the plurality of image data recorded on the first recording medium to a display device,
wherein the output unit outputs discrimination information for discriminating the image data from the first image data to the second image data determined by the determining unit to the display device such that the discrimination information is displayed together with the representative images of the image data from the first image data to the second image data;
a designation unit adapted to designate, from the representative images of the plurality of image data displayed on the display device together with the discrimination information, the representative image of the image data to be recorded on the second recording medium in accordance with an instruction for designating the representative image by a user; and
a control unit adapted to control the reading unit to read the image data corresponding to the representative image data designated by the designation unit and control the communication unit to transfer the image data read by the reading unit to the recording apparatus such that the designated image data is recorded on the second recording medium.

13. The apparatus according to claim 12, wherein the output unit outputs information indicating a range from the first image data to the second image data determined by the determining unit to the display device.

14. The apparatus according to claim 12, wherein the determining unit determines the first image data and the second image data according to a recording order of the plurality of image data recorded on the first recording medium.

15. The apparatus according to claim 12, wherein the determining unit determines as the first image data the image file other than the image data which has already been transferred to the recording apparatus from the plurality of image data recorded on the first recording medium.

* * * * *